United States Patent
Yamamoto et al.

(10) Patent No.: US 6,330,085 B1
(45) Date of Patent: *Dec. 11, 2001

(54) IMAGE PROCESSING APPARATUS AND METHOD

(75) Inventors: Nobuo Yamamoto, Tokyo; Koichi Ishimoto, Yokohama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/684,965

(22) Filed: Jul. 19, 1996

(30) Foreign Application Priority Data

Jul. 20, 1995 (JP) .................................... 7-184189
Nov. 13, 1995 (JP) .................................... 7-294169

(51) Int. Cl.$^7$ .................................... H04N 1/46
(52) U.S. Cl. .................... 358/538; 358/448; 358/453
(58) Field of Search .................... 358/538, 453, 358/448, 452, 537

(56) References Cited

U.S. PATENT DOCUMENTS

| | | | |
|---|---|---|---|
| 4,007,362 | * 2/1977 | Sindermann | 358/452 |
| 5,027,197 | * 6/1991 | Endo | 358/538 |
| 5,086,346 | * 2/1992 | Fujisawa | 358/453 |
| 5,239,370 | * 8/1993 | Yamaguchi | 358/500 |
| 5,493,424 | * 2/1996 | Tomita et al. | 358/538 |
| 5,576,847 | * 11/1996 | Sekine et al. | 358/453 |
| 5,666,207 | * 9/1997 | Ohmura | 358/452 |

* cited by examiner

Primary Examiner—Thomas D. Lee
(74) Attorney, Agent, or Firm—Fitzpatrick, Cella, Harper & Scinto

(57) ABSTRACT

An image processing apparatus including an area setting unit for setting an area in an image, an image processing setting unit for setting a desired image processing to each area set by the area setting unit, a calculation unit for calculating an outer frame in accordance with the set area, and a designating unit for a user to designate a color of the outer frame, wherein the image is synthesized with the set outer frame having the designated color, and the synthesized image is displayed.

5 Claims, 25 Drawing Sheets

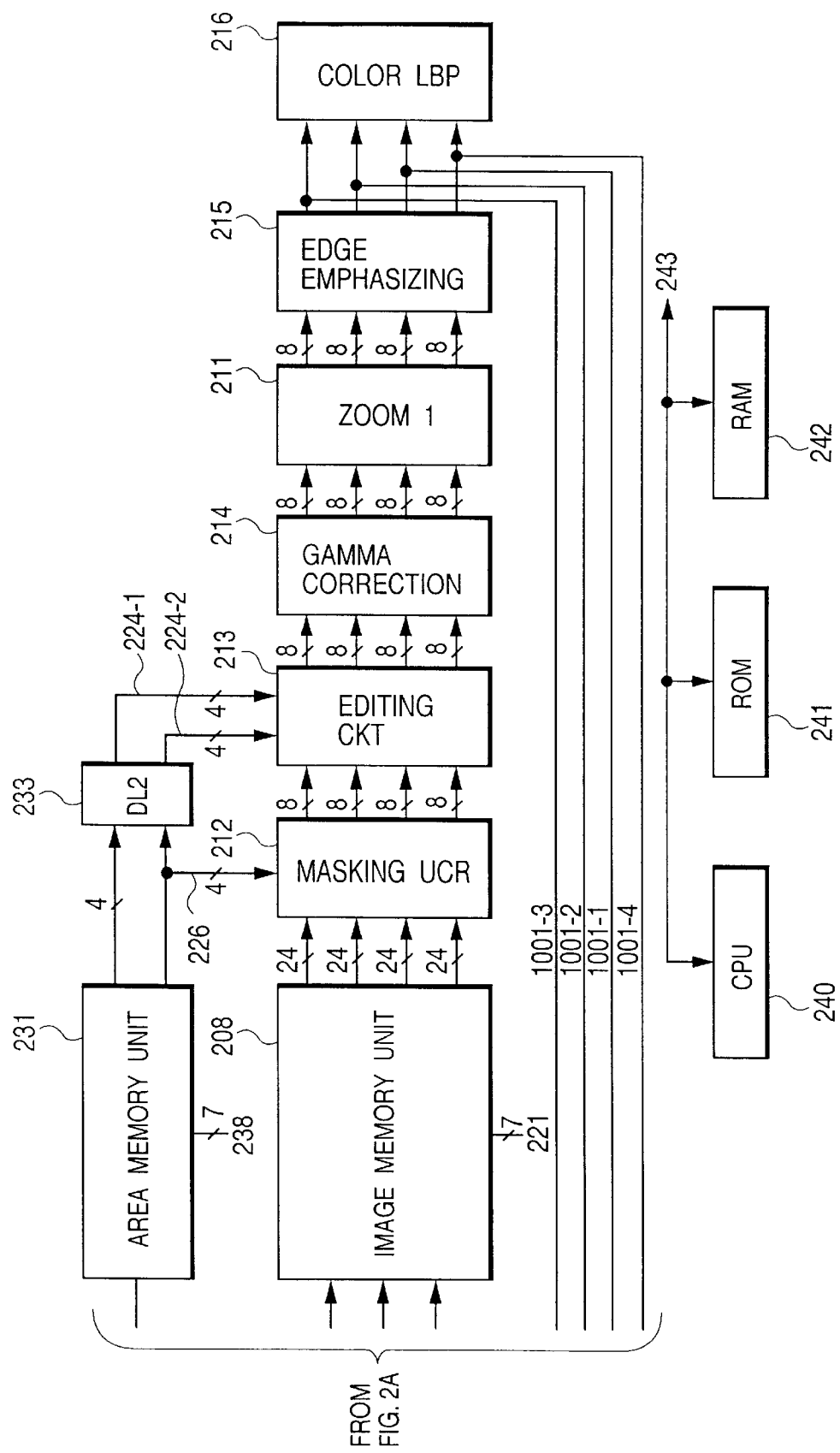

IMAGE PROCESSING APPARATUS AND METHOD

BACKGROUND OF THE INVENTION

1. Field of the Invention

The present invention relates to an image processing apparatus and method for performing an area editing process.

2. Related Background Art

High image quality and sophisticated functions of digital color copiers are becoming more common. A color adjustment process and an editing process for an output image nowadays meet most of requirements of users. Copiers having a so-called preview function are also being manufactured. With this preview function, instead of printing out an image several times on recording sheets in order to obtain a desired image, an image is displayed on a CRT or the like.

There are copiers having a monochrome liquid crystal display for displaying and confirming a read original image. For a color copier, however, a preview system of full-color is desired in order to adjust colors.

One example of a preview system is shown in FIG. 24. Blocks 101 to 109 constitute a full-color copier, and blocks 110 and 111, and 219 constitute a preview system.

In FIG. 24, reference numeral 101 represents an RGB output sensor for reading a reflection original, reference numeral 102 represents an S/H and A/D converter, reference numeral 103 represents a shading correction circuit, reference numeral 104 represents an input masking circuit, reference numeral 105 represents a LOG converter circuit, reference numeral 106 represents a masking UCR for adjusting the colors to match the printer characteristics, reference numeral 107 represents an image editing circuit for performing various processes such as trimming, masking, painting, and a variable power process, reference numeral 108 represents an edge emphasis circuit, and reference numeral 109 represents a printer unit for scanning a reflection original three or four times to print out a full-color image.

Reference numeral 110 represents an image memory unit for storing image signals (RGB) after input masking, reference numeral 111 represents a memory control circuit for controlling the image memory 110 (the memory control circuit having an address counter and controlling data transfer between an unrepresented CPU and image memory), and reference numeral 219 represents a CRT for displaying data in the image memory. If a read image is simply displayed on CRT, a desired editing process entered from an operation unit is not reflected on the image. Therefore, data in the image memory unit 110 is made accessible by CPU and the editing process equivalent to the editing circuit 107 is performed by software to obtain a final image.

Requirements for high speed digital color copiers are strong. In order to achieve high speed processing, a color LBP has been proposed which has four photosensitive drums and Y, M, C, and K developers. For this color LBP, an image memory is essential in order to compensate for a spacial shift between drums, and it is preferable to provide a full-page image memory in order to realize highly sophisticated image processing.

Consider now that the editing process is set, changed, or modified while referring to a final image reflecting the editing process. If a plurality of areas are designated as shown in FIG. 18, it is not clear that the editing process is set, changed, or modified to which area. Further, if the color of a frame of an area to be modified is similar to the original color, the range of the area becomes indefinite.

SUMMARY OF THE INVENTION

The invention has been made under the above circumstances and aims at making it easy to recognize an area frame during the area editing process and allowing the editing process to be efficiently performed.

According to one aspect of the present invention, there is provided an image processing apparatus comprising: area setting means for setting an area in an image; image processing setting means for setting a desired image processing to each area set by the area setting means; calculation means for calculating an outer frame in accordance with the set area; and designating means for a user to designate a color of the outer frame, wherein the image is synthesized with the set outer frame having the designated color, and the synthesized image is displayed.

According to another aspect of the present invention, there is provided an image processing apparatus for performing a desired image processing relative to an arbitrary area in a color image, comprising: setting means for setting an outer frame in accordance with the arbitrary area; and means for generating outer frame color image data by performing a color inversion process for color image data corresponding to the outer frame, wherein the color image is synthesized with the outer frame of the outer frame color image data, and the synthesized image is displayed.

According to a further aspect of the present invention, there is provided an image processing apparatus capable of setting a plurality of area processes each performing a desired image processing for a plurality of areas in an image, comprising: setting means for setting an area in the image; and area process setting means for dividing set areas into groups, and setting an image processing to a group of areas, wherein: if the position of an area in the image set by the area setting means is to be distinguished, the image is synthesized with the frame image of the outer frame of the area in a first color and the synthesized image is displayed; and if the positions of a group of areas set by the area process setting means is to be distinguished, the image is synthesized with the frame image of the outer frames of the group of areas in a second color and the synthesized image is displayed.

According to a still further aspect of the present invention, there is provided an image processing apparatus comprising: area setting means for setting a plurality of areas in an image; image processing setting means for setting a desired image processing to each area set by the area setting means; and calculation means for calculating an outer frame of the area set by the area setting means, in accordance with the contents of the set image processing and the set area, wherein the image is synthesized with the calculated outer frame, and the synthesized image is displayed.

According to another aspect of the invention, there is provided an image processing apparatus comprising: area setting means for setting a plurality of areas in an image; and calculation means for calculating an outer frame of the area to which the image processing is performed in accordance with a priority order of the area, wherein the image is synthesized with the calculated outer frame, and the synthesized image is displayed.

The above and other objects of the invention will become apparent from the following detailed description and the claims when read in connection with the accompanying drawings.

DETAILED DESCRIPTION OF THE PREFERRED EMBODIMENTS (First Embodiment)

Figure 1:
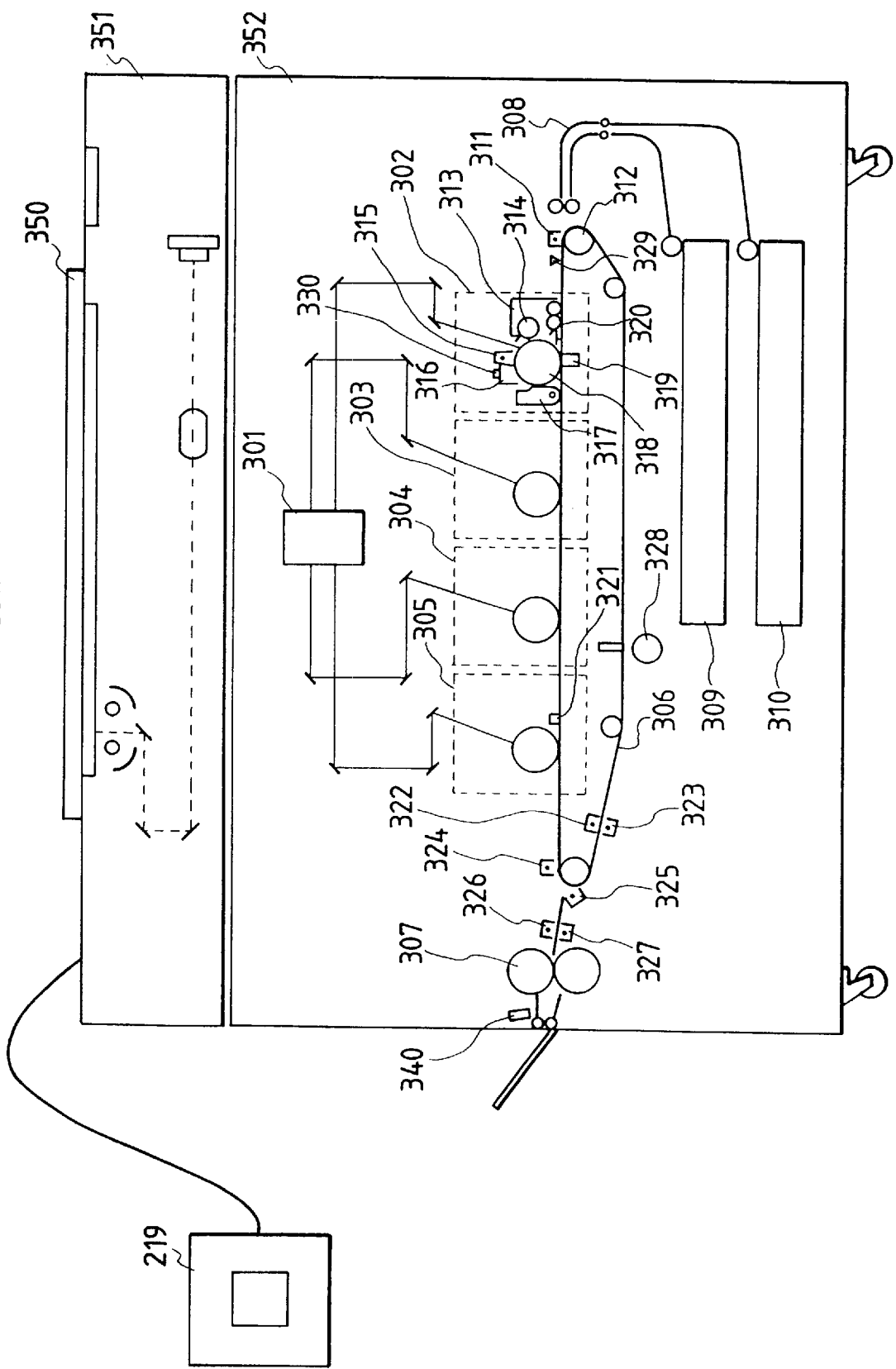
FIG. 1 is a schematic diagram showing an example of an image forming apparatus according to a first embodiment of the invention.

FIG. 1 is a schematic diagram showing the structure of a copier according to the first embodiment.

The color copier of this embodiment is constituted by a color reader unit 351 and a printer unit 352. The color reader unit 351 reads a color original and executes a digital editing process and the like. The printer unit 352 produces a color image in accordance with a digital image signal for each color sent from the reader unit 351.

The color copier has a digitizer 350 and a monitor 219 for displaying a preview image. The monitor 219 is connected to the copier by VGA interface.

<Structure of Printer Unit>

Referring to FIG. 1, reference numeral 301 represents a polygon scanner for scanning a laser beam on a photosensitive drum 318, reference numeral 302 represents a first stage magenta (M) image forming unit, and reference numerals 303, 304, and 305 represent cyan (C), yellow (Y), and black (K) image forming units having the same structure as the magenta image forming unit 302. The polygon scanner 301 scans the photosensitive drum 318 with a laser beam of each color radiated from a laser element independently driven for MCYK by a laser controller unit.

In the image forming unit 302, the photosensitive drum 318 forms a latent image through exposure to a laser beam, and a developing unit 313 develops the latent image into a toner image on the photosensitive drum 318. In the developing unit 313, a sleeve 314 performs toner development by applying a developing bias. Reference numeral 315 represents a primary charger for charging the photosensitive drum 318 to a desired potential. Reference numeral 317 represents a cleaner for cleaning the surface of the drum 318 after the image transfer. Reference numeral 316 represents an auxiliary charger for discharging the surface of the drum 318 cleaned with the cleaner 317 to allow good charging by the primary charger 315. Reference numeral 330 represents a pre-exposure lamp for removing residual charges on the drum 318. Reference numeral 319 represents a transfer charger for discharging the drum from the back surface side of a transfer belt 306 to transfer the toner image on the drum 318 to a recording sheet.

Reference numerals 309 and 310 represent a cassette for accommodating recording sheets. Reference numeral 308 represents a paper feeder for feeding a recording sheet one after another from the cassettes 309 and 310. Reference numeral 311 represents a suction charger for sucking and attaching a recording sheet fed from the feeder unit to the transfer belt 306. Reference numeral 312 represents a transfer belt roller for rotating the transfer belt 306 and for sucking and attaching a recording sheet to the transfer belt 306 together with the suction charger 311.

Reference numeral 324 represents a discharger used for making a recording sheet easy to be separated from the transfer belt 306. Reference numeral 325 represents a charger used for eliminating an image disturbance to be caused by discharge when a recording sheet is separated from the transfer belt. Reference numerals 326 and 327 represent a pre-fixation charger used for eliminating an image disturbance for supplementing a suction force of the toner on the recording sheet after separation. Reference numerals 322 and 323 represent a transfer belt discharger for discharging the transfer belt 306 to electrostatically initialize it. Reference numeral 328 represents a belt cleaner for removing stains or dusts on the transfer belt 306. Reference numeral 307 represents a thermal fixing unit for thermally fixing a toner image charged again by the pre-fixation chargers 326 and 327 on a recording sheet. Reference numeral 340 represents a paper discharge sensor for detecting a recording sheet on a transport path along the fixing unit. Reference numeral 329 represents a paper front end sensor for sensing the front end of a recording sheet fed by the feeder unit 308 to the transfer belt. A detection signal of the paper front end is supplied from the printer unit 352 to the reader unit 351 and used for generating a sub scan synchronization signal which is used for the transmission of a video signal from the reader unit to the printer unit.

<Structure of Reader Unit>

Figure 2A:
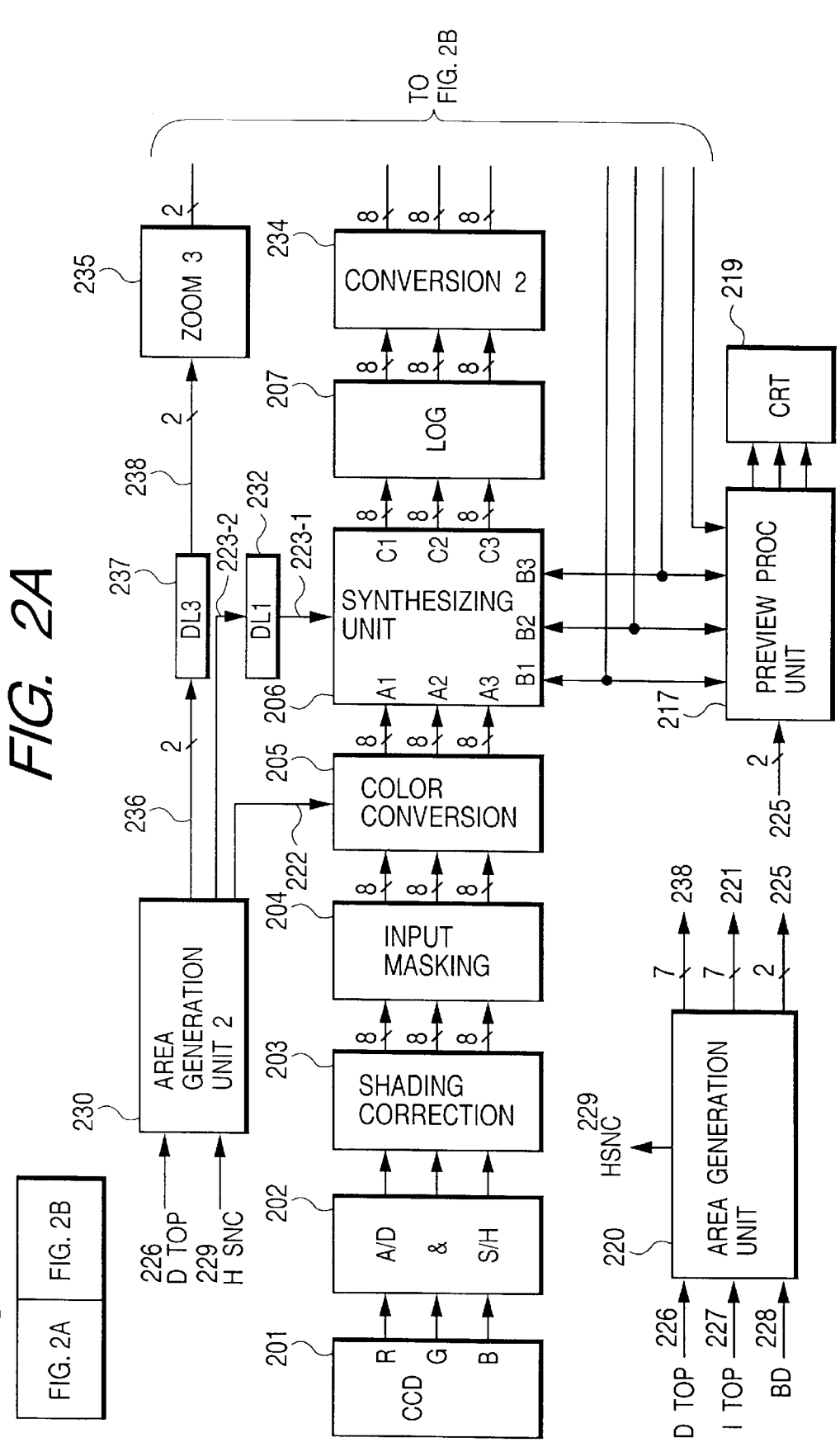
FIG. 2 which is composed of FIGS. 2A and 2B is a diagram showing an example of the structure of an image processing apparatus of the first embodiment.

FIGS. 2A and 2B are block diagrams showing a digital image processing unit of the reader unit-351. A color original placed on the original support is exposed. An image reflected from the original is picked up by CCD 201, output signals from which are sampled and held and thereafter converted by an A/D and S/H circuit 202 into three-color RGB digital signals. These color separated digital signals are subjected to a shading and black correction by a shading correction circuit 203, converted into an RGB signal on a predetermined color space of CCD 201 by a masking circuit 204, and color converted by a color conversion circuit 205 to supply the color converted signal to a synthesizing unit 206. The synthesizing unit 206 synthesizes the image data of a reflection original and the output data of an image memory 208, the synthesized result being subjected to a LOG correction process by a LOG conversion circuit 207 and to a variable power process (when a variable power is set) by a second variable power circuit 234. The variable power process is actually an enlargement process because the compression process by the image memory unit 208 operates as a low-pass filter. An output of the second variable power circuit 234 is input to the image memory unit 208.

The image memory unit 208 is constituted by three fields including a compression field, an image memory field, and an expansion field. The second variable power circuit 234 supplies one series of outputs to the image memory unit 208. There are four series of outputs to the masking UCR unit 212 because CMY data (24 bits×4) before an output masking process corresponding to the four drums are read from the image memory unit 208 synchronously with the image forming by the four drums.

The image memory unit 208 becomes necessary for correcting a difference between timings because the printer shown in FIG. 1 has each image forming unit at a different position and the image data of each image forming unit is different in position on the display screen. Compression and expansion is used for reducing the amount of image data and hence the memory capacity.

Reference numeral 212 represents a masking UCR unit for generating color signals for the respective drums, the color signals matching the printer characteristics. Reference numeral 213 represents an editing circuit for a free color process and a paint process. The edited result is subjected to a gamma correction by a gamma correction circuit 214, to a variable power process (specifically, a reduction process) by a first variable power circuit 211, and to an edge emphasis process by an edge emphasis circuit 215, and sent to a color LBP 216.

The masking UCR unit 212, editing circuit 213, gamma correction circuit 214, first variable power circuit 211, and edge emphasis circuit 215 each have four series of processing circuits corresponding to the four drums, and each series processes synchronously with the image forming by each drum.

Reference numeral 217 represents a preview processing unit which is constituted by a CRT image memory for storing edited image data and a memory control unit for controlling the CRT image memory. Reference numeral 219 represents a CRT display for displaying data in the CRT image memory.

Reference numeral 220 represents an area generating unit. This area generating unit 220 outputs a signal 229 which is either a signal generated from a main scan synchronization signal or a BD signal 228 output from LBP 216. The area generating unit 220 is inputted with a DTOP signal 226 output from the image front end sensor, and an ITOP signal 227 generated in LBP 216 (during printer output, a sub scan enable signal synchronous with the rotation of each drum is generated in response to this signal). The area generating unit 220 outputs: a signal 221 for controlling the image memory 208, including two write enable signals (a main scan write enable signal 221-1 and a sub scan write enable signal 221-2) and five read enable signals (a main scan read enable signal 221-3 and sub scan read enable signals 221-M, 221-C, 221-Y, and 221-K); signals 238 (a main scan write enable signal 238-1, a sub scan write enable signal 238-2, a main scan read enable signal 238-3, and sub scan read enable signals 238-M, 238-C, 238-Y, and 238-K) generated synchronously with the ITOP signal 227 while considering delays at the compression and expansion fields of the image memory 208 to adjust the timings of the image signal and an area signal; and an enable signal 225 (for main scan and sub scan) for a CRT image memory for the preview process.

The read enable signal used for independently controlling the four series for reading image data from the image memory unit 208 is different when it is used for the image forming or for the preview display.

Specifically, when the read enable signal is sued for the image forming, it is synchronized with the image forming by each drum, and sub scan enable signals 221-(M to K) are output in accordance with the positions of the four drums. When the read enable signal is used for the preview display, the sub scan enable signals 221-(M to K) are output at the same timing.

Reference numeral 230 represents a second area generating unit for generating an area signal for each editing process. This unit is constituted by a bit map memory and a bit map memory controller (e.g., AGDC (Advanced Graphic Display Controller)) for controlling the bit map memory. A write operation is controlled by CPU 240, whereas a read operation is performed synchronously with an HSNC signal 229 and the DTOP signal 226 synchronizing with the scanning an original image.

CPU 240 calculates an area in accordance with a point designated by a digitizer, and writes it in the second area generating unit 230.

If an area is corrected while observing the preview display, the area stored in the second area generating unit 230 is modified under the control of CPU 240.

A signal 205 is an enable signal of the color conversion circuit, a signal 223-2 is an enable signal of the image synthesis circuit, and a signal 236 is an enable signal of the masking UCR unit 212 and the editing circuit 213 for performing the free color mode, paint mode, and the like.

An area memory unit 231, delay circuits 232 (DL1), 233 (DL2), and 237 (DL3), and a third variable power circuit 235 operate to adjust a timing when the image signal and area signal are synchronized together.

Specifically, the delay circuit DL1 delays the output signal 223-2 of the area generating unit 230 by a process time required by the color conversion circuit 205. A pixel delay is achieved by a D-type flip-flop and a line delay is achieved by a FIFO memory.

The delay circuit DL2 delays the output signal 226 of the area memory unit 231 by a process time required by the masking UCR circuit 226. A pixel delay is achieved by a D-type flip-flop and a line delay is achieved by a FIFO memory.

The delay circuit DL3 delays the output signal 236 of the area generating unit 230 by a process time required by the color conversion circuit 205, image synthesizing circuit 206, and LOG conversion circuit 207. A pixel delay is achieved by a D-type flip-flop and a line delay is achieved by a FIFO memory.

The variable power circuit 235 actually performs an enlargement process and is controlled in quite the same manner as the variable power circuit 234 (delay times are the same).

The area memory unit 21 compensates for the process time required by the image memory unit, and supplies control signals which are different for each color, in response to a signal 238.

Reference numeral 240 represents a CPU which controls a program ROM 241 and a working RAM 242 via a CPU bus 243. Each circuit described earlier is connected to the CPU bus 243 and is set with data by CPU 240 via the CPU bus 243.

An operation unit 224 is used for designating various displays and for setting various parameters, to be described later.

<Signal Flow in Each Image Mode>

A flow of a video signal and setting an I/O port in each mode will be described with reference to FIGS. 2A and 2B.

(Normal Copy)

The flow of a video signal is 201→202→203→204→205→206 (A input→C output) →207→234→208→212→213→214→211→215→216.

The sub scan read enable signals 221-(M to K) and 238-(M to K) are controlled to become enable in accordance with the distances between the respective color drums.

(Display of RGB Editing Process (Color Conversion) Result on CRT)

The flow of a video signal is 201→202→203→204→205→206 (A input→C output) →207→234→208→212→213→214→211→215→217→219.

In this mode, data in the image memory unit 208 is updated each time the editing contents are modified in the preview mode so that each time the data is displayed on CRT, the original is read (the flow of a video signal is repeated starting from 201). At this time, the sub scan read enable signals 221-(M to K) and 238-(M to K) rise and fall at the same time.

For printing out an image after the preview, the optical scanning is not performed but printing is performed simply by reading the data from the image memory 208. At this time, the sub scan enable signals 221-(M to K) are controlled to become enable in accordance with the distances between the respective color drums.

(Display of CMYK Editing Process (Paint, Free Color) Result on CRT)

The flow of a video signal is 201→202→203→204→205→206 (A input→C output) →207→234→208→212→213→214→211→215→217→219.

In this mode, data in the image memory unit 208 does not change with the editing contents in the preview mode so that for displaying the data on CRT at the second and following times, the optical scan is not performed but the data is displayed simply by changing the editing parameters and reading the data from the image memory 208 (the flow of a video signal starts from 208).

At this time, the sub scan read enable signals 221-(M to K) and 238-(M to K) rise and fall at the same time.

For printing out an image after the preview, the optical scanning is not performed but printing is performed simply by reading the data from the image memory 208.

At this time, the sub scan enable signals 221-(M to K) are controlled to become enable in accordance with the distances between the respective color drums.

(Display of Synthesis Result on CRT)

(1) The flow of a video signal, when a first image is written, is 201→202→203→204→205→206 (A input→C output) →207→208.

(2) The flow of a video signal, when the first image is synthesized with a second image and the result is written in the image memory 208, is as follows.

(2-1) For memory output, the flow is 208→212→213→211→214→215→206. In this case, the data passes through the masking UCR circuit 212 without any process, and the gamma correction circuit 214 is set with an inverse LOG table.

(2-2) For a video signal from a reflection original, the flow is 201→202→203→204→205→206.

(3) The flow of an output from the synthesis circuit is 206→207→208 (memory write), and the flow to a CRT output is 208→212→213→214→211→215→217→219.

<Settings in Editing Mode and Printing with Preview Function>

Figure 3:
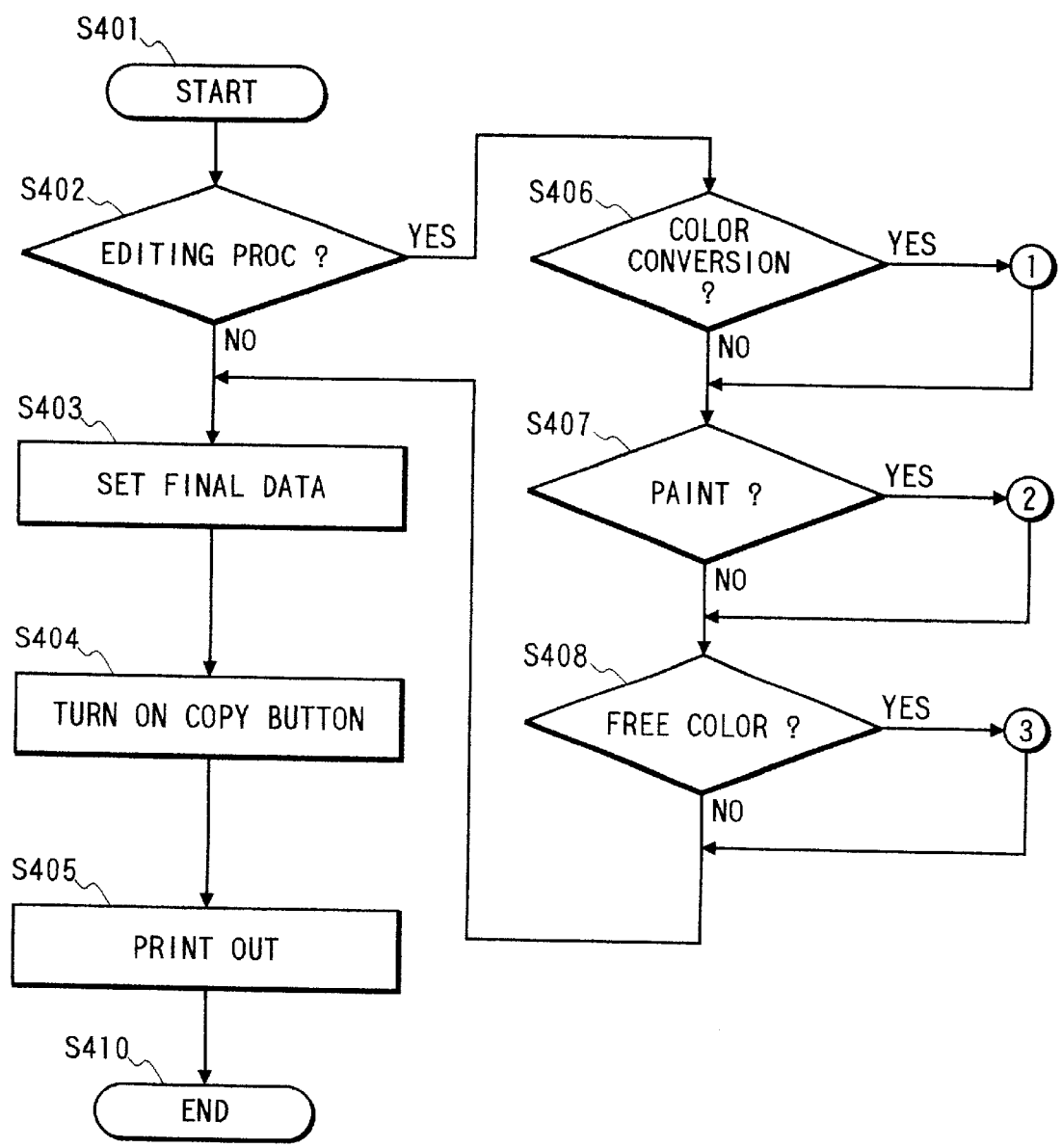
FIG. 3 is a flow chart illustrating an example of the overall operation of an editing process of the first embodiment.

The overall flow will be described with reference to FIG. 3.

First, an editing process is selected from the operation unit (FIG. 11) (S402), next, at least one of a color conversion process (S406), a paint process (S407), and a free color process (S408) is selected, and final parameters are determined using the preview function and the like (S403). The final image is printed out (S405) in response to turning on a copy button (S404).

The procedure of each image process mode will be described.

(1) Color Conversion Process

Figure 4:
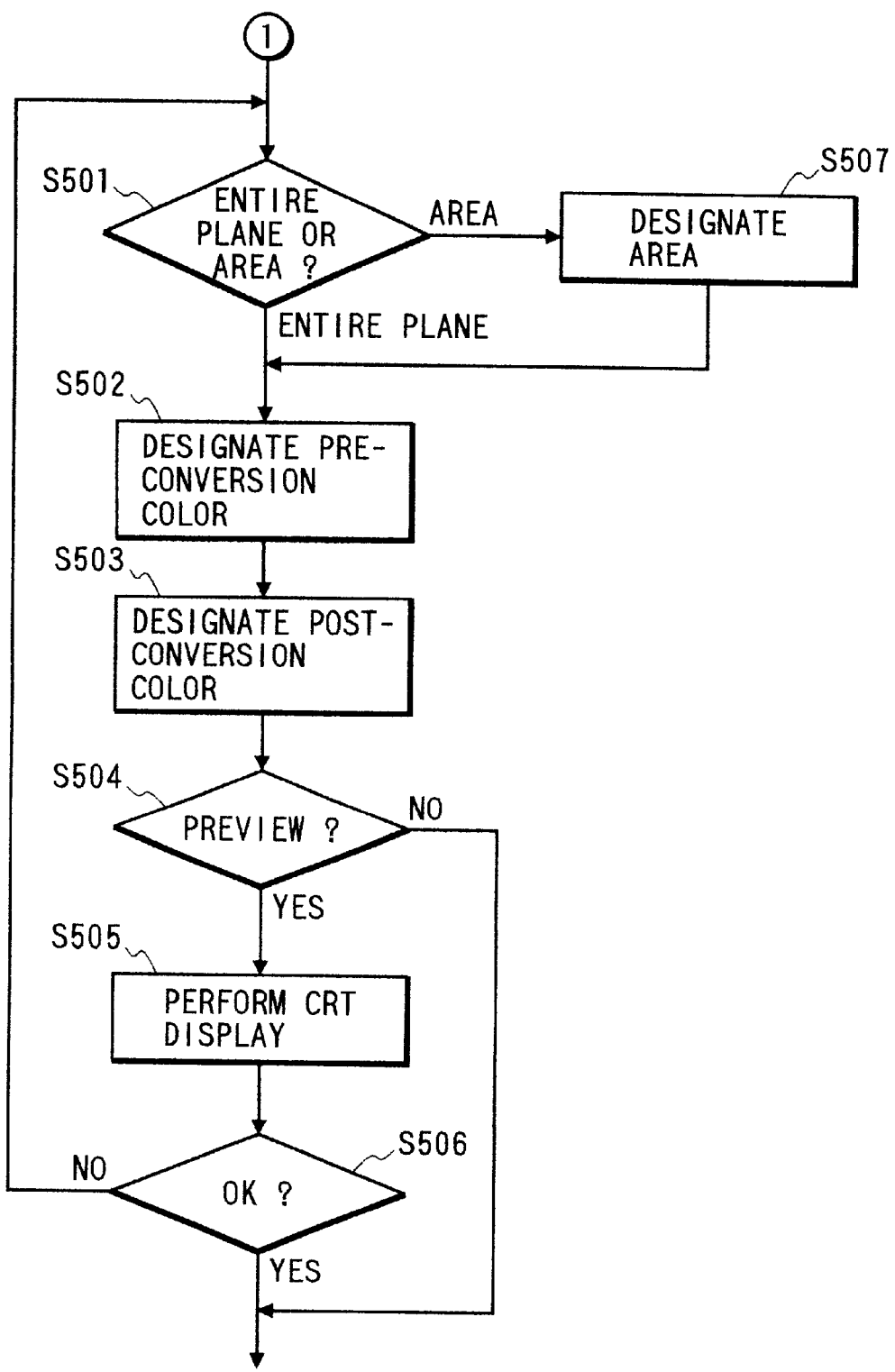
FIG. 4 is a flow chart illustrating an example of the operation of a color conversion process of the first embodiment.

The color conversion process will be described with reference to the flow chart of FIG. 4. For the color conversion process, either an entire surface color conversion or an area color conversion is selected (S501). If the area color conversion, an area is set, for example, by using an unrepresented digitizer (S507). Next, a pre-conversion color is designated (S502) and a post-conversion color is designated (S503) to determine data necessary for the color conversion. When a preview function is selected at S504 (e.g., by depressing a preview button 50105), a reflection original placed on the original support is read and the read data is processed in the order described with the above paragraph (Display of RGB Editing Process (Color Conversion) Result on CRT) to display it on CRT at S505. If an operator is satisfied with the displayed result, another editing process is set or the displayed result is printed out, whereas if not satisfied, the setting is repeated until the operator is satisfied (S506).

(2) Paint Process

Figure 5:
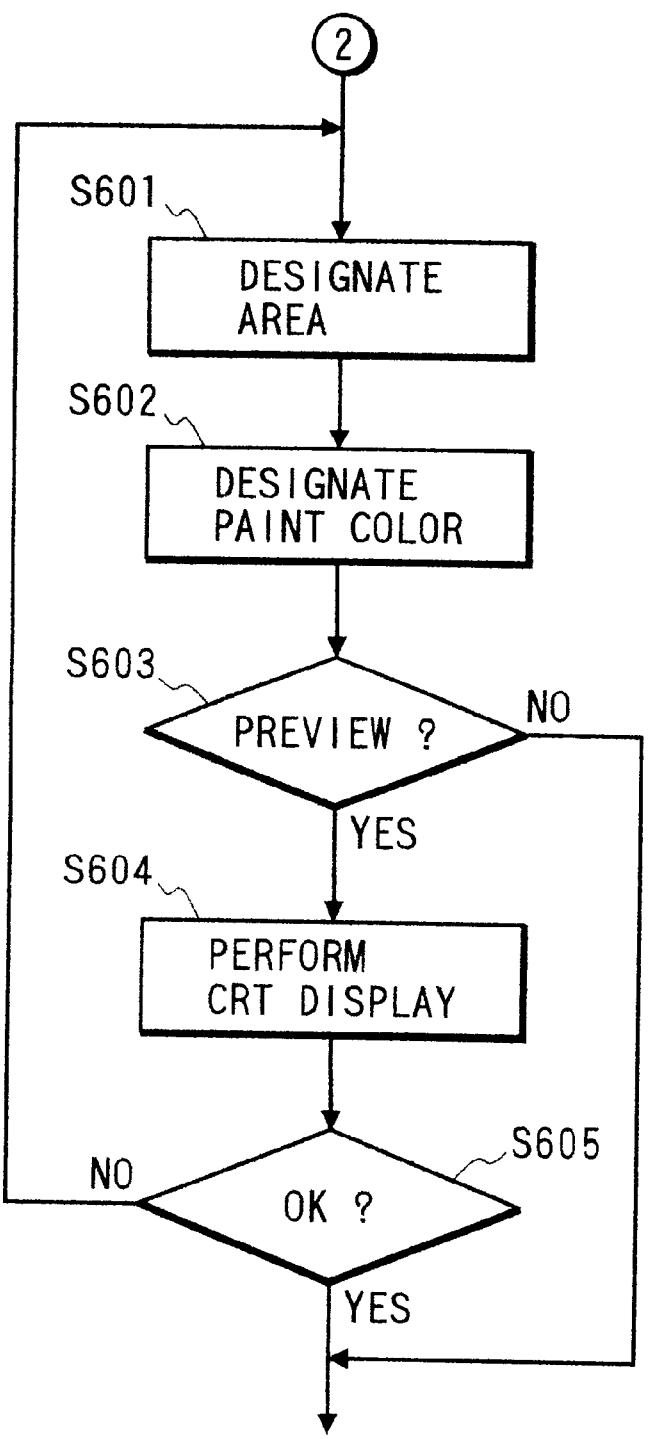
FIG. 5 is a flow chart illustrating an example of the operation of a paint process of the first embodiment.

The paint process will be described with reference to the flow chart of FIG. 5. For the paint process, an area is set, for example, by using an unrepresented digitizer (S601). Next, a paint color is designated at S602. When a preview function is selected at S603, a reflection original placed on the original support is read and the read data is processed in the order described with the above paragraph (Display of CMYK Editing Process (Paint, Free Color) Result on CRT) to display it on CRT at S604. If an operator is satisfied with the displayed result, another editing process is set, final parameters are set, or the displayed result is printed out, whereas if not satisfied, the setting is repeated until the operator is satisfied (S605).

(3) Free Color Process

Figure 6:
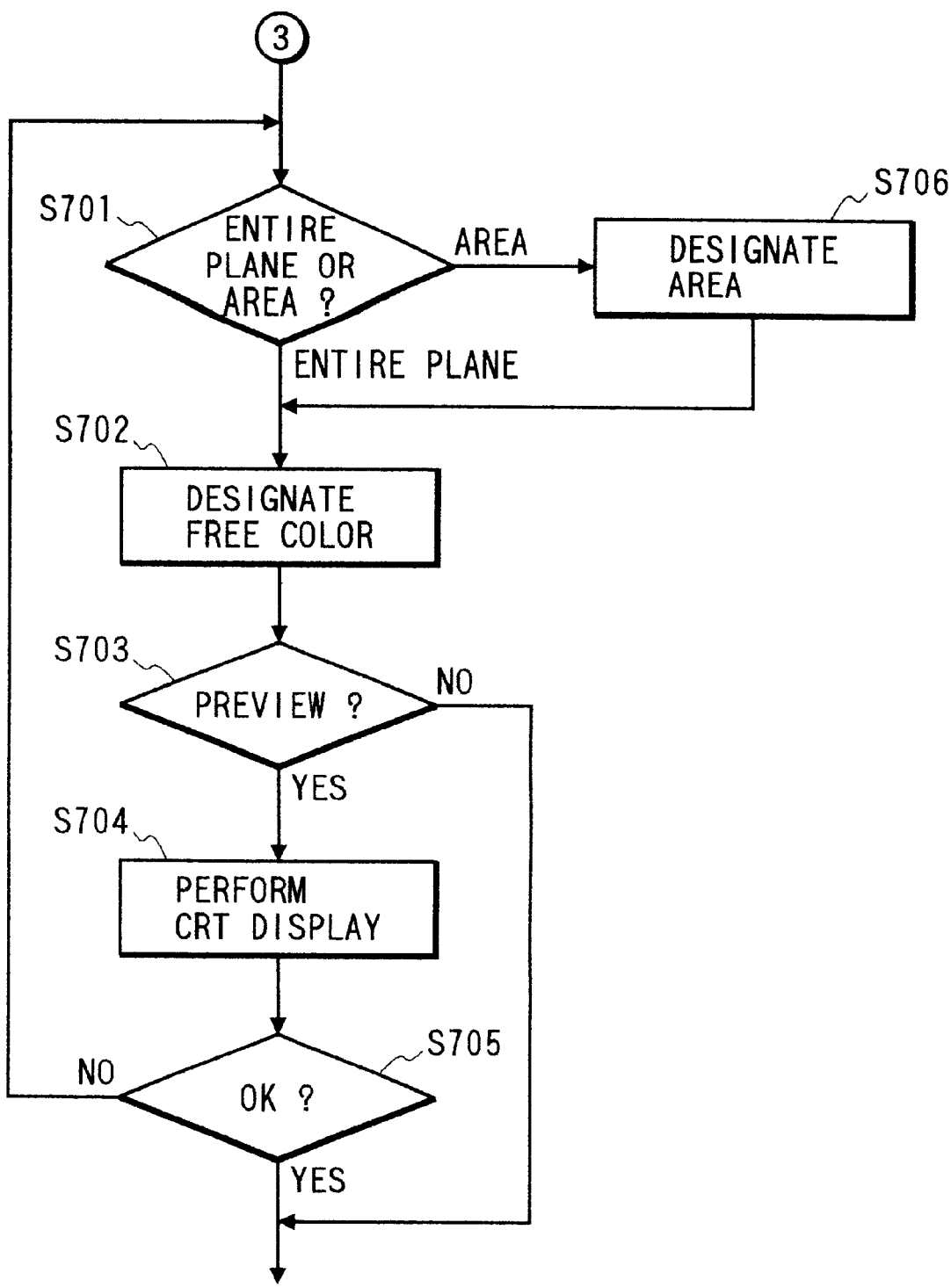
FIG. 6 is a flow chart illustrating an example of the operation of a free color process of the first embodiment.

The free color process will be described with reference to the flow chart of FIG. 6. For the free color process, either an entire surface mode or an area mode is selected (S701). If the area mode, an area is set, for example, by using an unrepresented digitizer (S706). At S702, a color for the free color process is designated. When a preview function is selected at S703, a reflection original placed on the original support is read and the read data is processed in the order described with the above paragraph (Display of RGB Editing Process (Color Conversion) Result on CRT) to display it on CRT at S704. If an operator is satisfied with the displayed result, another editing process is set or the displayed result is printed out, whereas if not satisfied, the setting is repeated until the operator is satisfied (S705).

<Description of Color Conversion Circuit>

Figure 9:
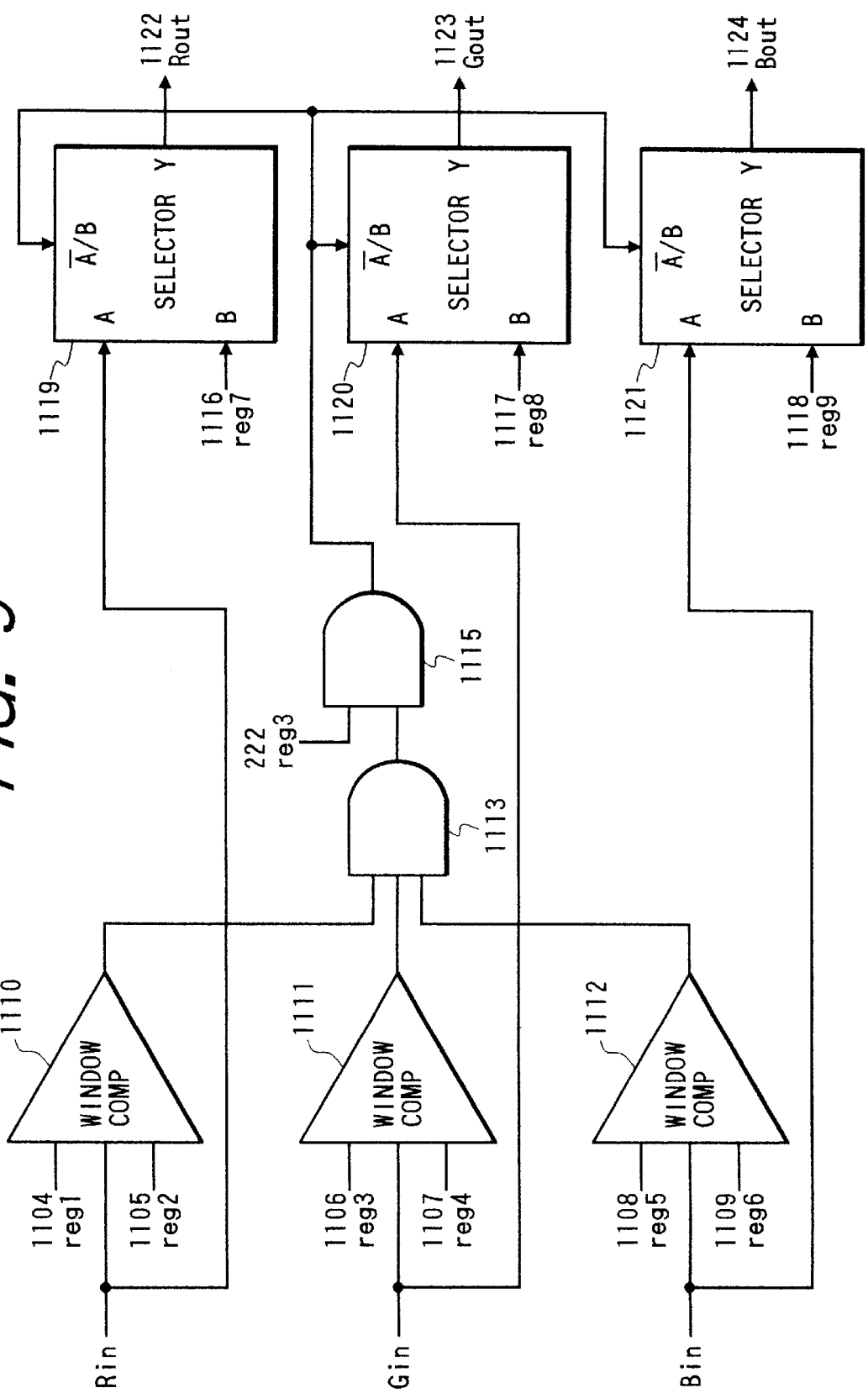
FIG. 9 is a diagram showing an example of the structure of a color conversion circuit of the first embodiment.

FIG. 9 is a diagram illustrating a color conversion process.

The color conversion process unit is divided in a detection unit and a conversion unit.

The detection unit is constituted by three window comparators 1110, 1111, and 1112, two AND gates 1113 and 1115, and registers 1104 to 1109 set by CPU 240 for controlling the comparators and gates. In operation, under the conditions that:

reg1 $\leq$ input video $R(1101) \leq$ reg2 reg3 $\leq$ input video $G(1102) \leq$ reg4 reg5 $\leq$ input video $B(1103) \leq$ reg6, the three window comparators 1110 to 1112 and two AND gates 1113 and 1115 output "1" and a certain characteristic color only is detected (where the area signal 212 is "1").

The conversion unit is constituted by three selectors 1119, 1120, and 1121 and registers 1116 to 1118. If an output of the AND gate 1115 is "1", the contents of the registers 1116 to 1118 set by CPU 240, i.e., converted colors are output as signals 1122 to 1124, whereas if the output is "0", the video signals themselves (1101 to 1103) are directly output.

<Description of Paint, Free Color Circuit>

Figure 10:
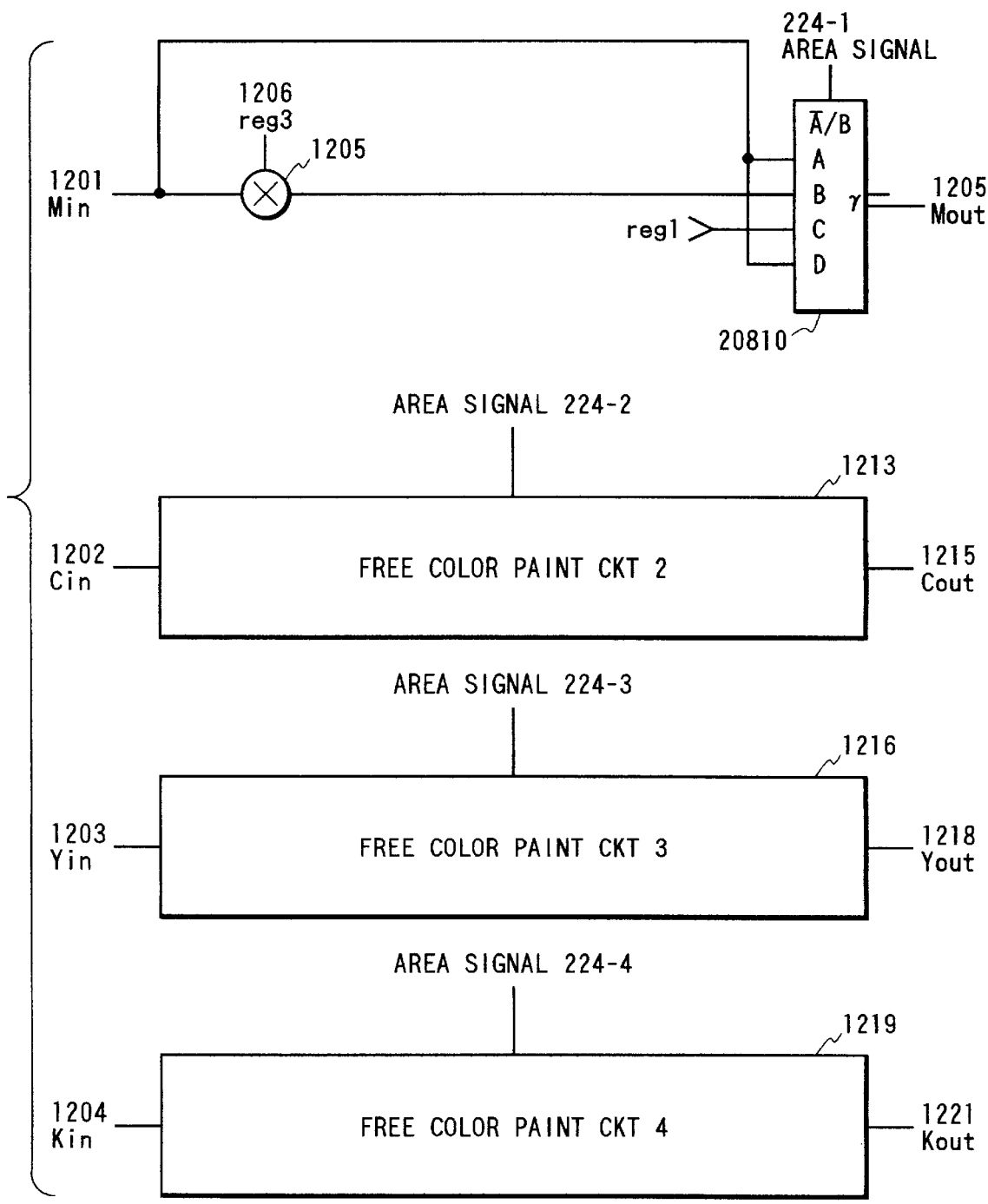
FIG. 10 is a diagram showing an example of the structure of a free color paint circuit of the first embodiment.

FIG. 10 is a block diagram illustrating a free color paint process.

The free color paint circuit is constituted for each color video signal by a multiplier 1205, a selector 1210, and registers 1206 and 1207 set by CPU 240.

In operation, for the free color process, an ND signal (M/3+C/3+Y/3) generated by the masking UCR circuit and data in the register reg3 1206 which is determined by a color designated by a user are multiplied by the multiplier 1205. An output of the multiplier is selected by the selector 1210 and output (1212). If the free color process is to be performed for part of an original, the area signal 224-1 is set to "1" only for the processed area (in this case, the signal 224-2 is set to "0"). In this case, the masking UCR circuit is controlled in accordance with the signal 226 so that the ND signal is output only for this area signal.

For the paint process, the selector 1210 is controlled to set the area signal 224-2 to "1" so that the register reg1 1207 set by CPU 240 is set (in this case, the signal 224-1 is set to "0").

Reference numeral 1213 represents a free color paint circuit for cyan (C), reference numeral 1216 represents a free color paint circuit for yellow (Y), and reference numeral 1219 represents a free color paint circuit for black (B). The inputs of these circuits are Cin 1202, Yin 1203, and Kin 1204, and the outputs thereof are Cout 1215, Yout 1218, and Kout 1221. These circuits are controlled by a second area signal 224-2, a third area signal 224-3, and a fourth area signal 224-4.

When the preview image is displayed on CRT, the signals 224-1 to 224-3 are controlled to be enabled at the same time.

<Description of Preview Processing Unit>

Figure 7:
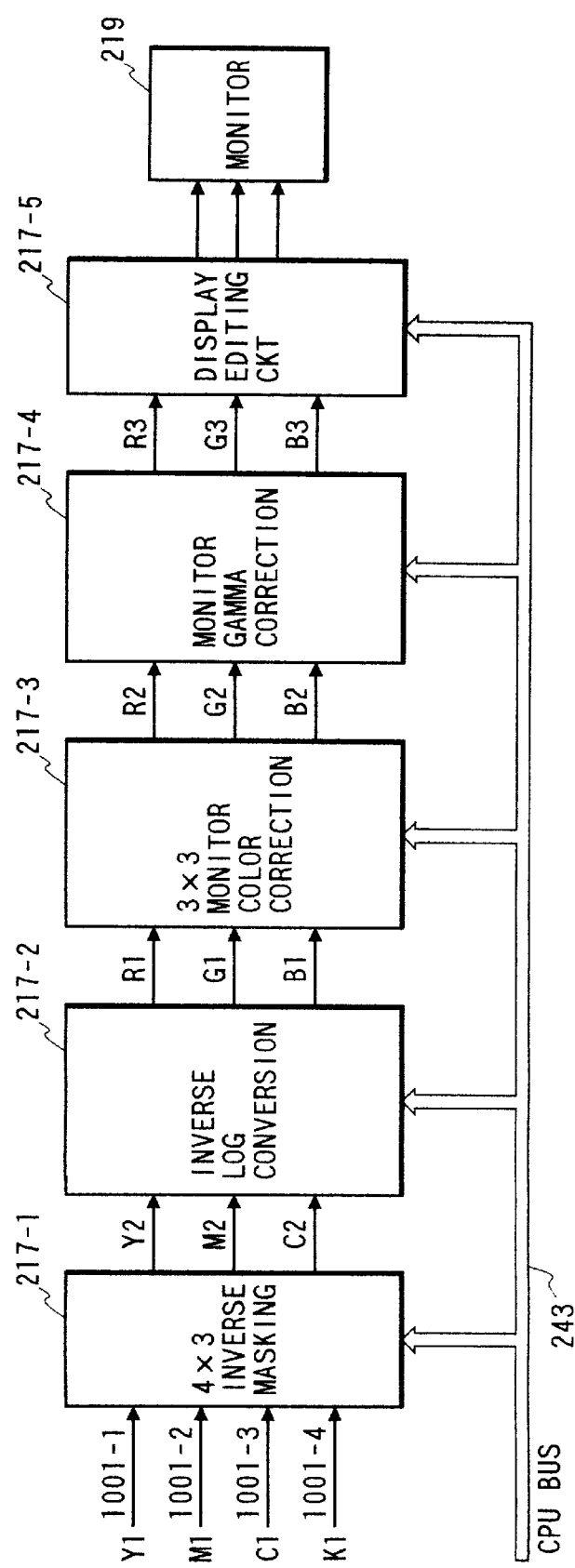
FIG. 7 is a diagram showing an example of the structure of a preview processing unit of the first embodiment.

FIG. 7 is a block diagram of a preview processing circuit for processing read image data at all the processing circuits and displaying the final image on CRT 219.

Final image data (8-bit data for each YMCK) Y1, M1, C1, and K1 1001-1 to 1001-4 output from the edge emphasis circuit 215 are input first to a 3×4 inverse masking correction circuit 217-1 to execute the following calculations which are inverse calculations of the masking UCR circuit 212 shown in FIGS. 2A and 2B.

$Y2=a11*Y1+a12*M1+a13*C1+a14*K1$ $M2=a21*Y1+a22*M1+a23*C1+a24*K1$ $C2=a31*Y1+a32*M1+a33*C1+a34*K1$

Arbitrary coefficients a11 to a34 can be set by CPU 240 via the CPU bus 243. The four-color information Y1, M1, C1, and K1 is converted into three-color information Y2, M2, and C2 by the 3×4 inverse masking correction of the masking UCR circuit 212.

Next, an inverse logarithm conversion correction circuit 217-2 performs an inverse calculation of the LOG process 207 for the three-color density information Y2, M2, and C2 to obtain the luminance information on a predetermined color space based on the three-color CCD 201, R1, G1, and B1. The LOG process 207 is performed by using an LUT. Similar to the above, arbitrary correction data can be set by CPU. With these calculations, the YMCK density data is converted into luminance data reflecting the color processing for allowing to display it on CRT. There are many types of CRTs having various color reproduction characteristics. Therefore, means for matching the characteristics of CRT 219 with the output image on the color LBP 216 is necessary. Namely, it is necessary to correct the luminance information R1, G1, and B1 in accordance with the display characteristics of CRT 219 and the observation conditions.

A 3×3 monitor color correction circuit 217-3 corrects the luminance data to match the monitor color characteristics and make the hues of the image on the monitor and the image printed out on a recording sheet, and executes the following calculations.

$R2=b11*R1=b12*G1+b13*B1$ $G2=b21*R1=b22*G1+b23*B1$ $B2=b31*R1=b32*G1+b33*B1$

There are many types of CRTs having various color reproduction characteristics and also there are various illumination conditions. Therefore, the following factors are required to be taken into consideration in order to match the hue of the image on the monitor with the hue of the image printed out on a recording sheet.

a) color temperature of the monitor, b) coloring characteristics of the monitor, and c) illumination light.

In this embodiment, the color temperature of the monitor was limited to a range from 6500K to 5000K. The coloring characteristics of monitors manufactured by typical makers were studied. Since a fluorescent lamp is generally used for illumination light, the color temperatures of typical five types of fluorescent lamps were measured, including daylight (6500K), cool white (5000K), white (4150K), warm white (3500K), and incandescent lamp color (3000K).

In this embodiment, a 3×3 matrix corresponding to a combination of the above three factors is prepared.

The factors a) and b) depend on the monitor characteristics, and the factor c) depends on the observation conditions.

Figure 19:
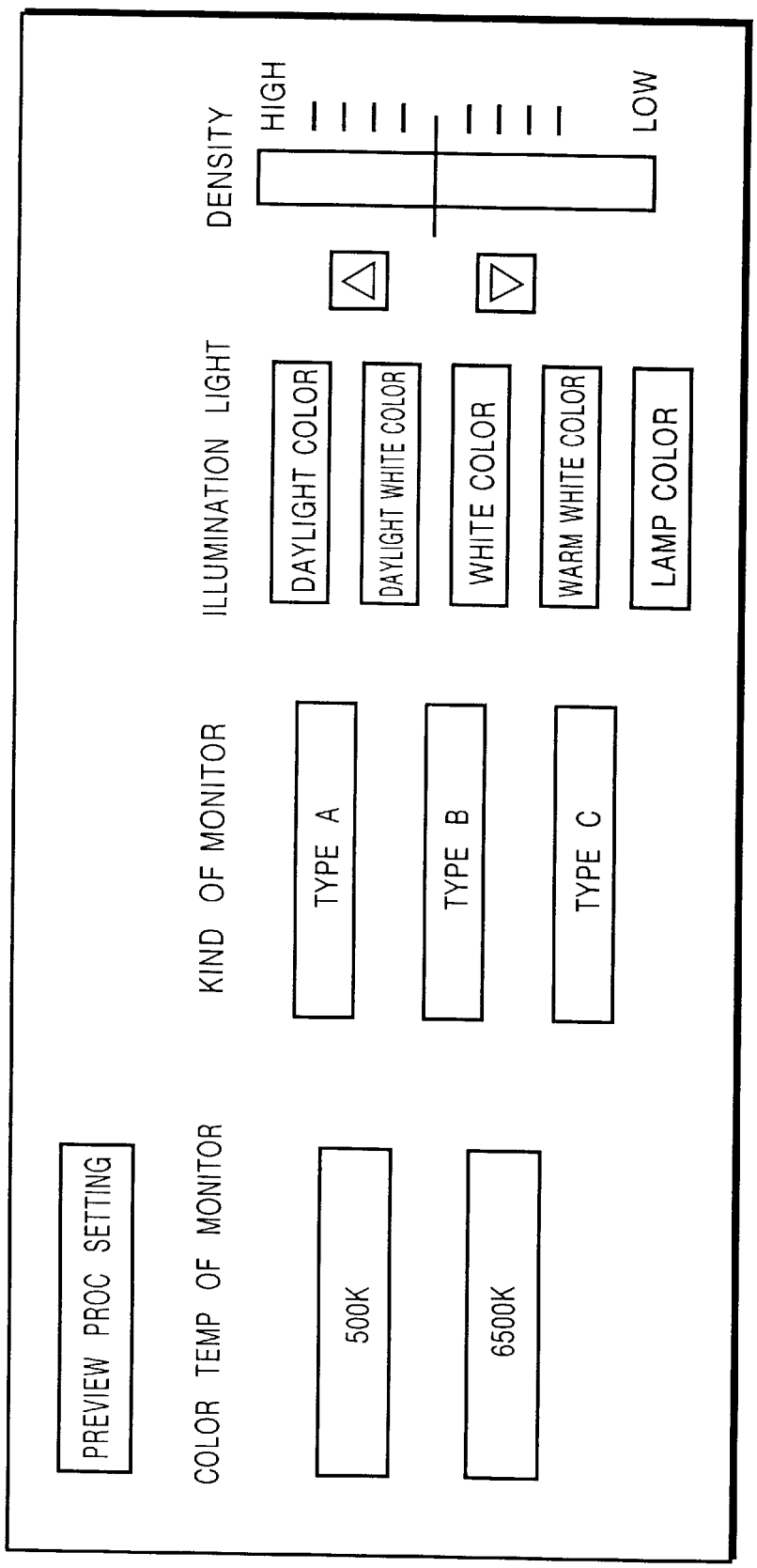
FIG. 19 is a diagram showing an example of a display on an operation screen of the first embodiment.

The 3×3 matrix color correction is performed by using the 3×3 matrix, in accordance with the monitor color temperature a), monitor coloring characteristics b), and the type of illumination light c) set by an operator from the operation unit shown in FIG. 19.

The method of calculating a 3×3 matrix will be described.

The xy chromaticity coordinates and luminance Y of each of three primaries [R], [G], and [B] of CRT monitors are measured. The xyz chromaticity coordinates of the measured [R] are represented by (xr, yr, zr) and a sum of XYZ tristimulus values of the unit value of [R] is represented by Sr, where zr=1−xr−yr, and Sr is an unknown value. The similar notation is applied to [G] and [B]. Then, the following equation stands where [ ] is a symbol representing color stimulus.

$$\begin{bmatrix} X \\ Y \\ Z \end{bmatrix} = \begin{bmatrix} xr & xg & xb \\ yr & yg & yb \\ zr & zg & zb \end{bmatrix} \begin{bmatrix} Sr & 0 & 0 \\ 0 & Sg & 0 \\ 0 & 0 & Sb \end{bmatrix} \begin{bmatrix} R \\ G \\ B \end{bmatrix} = M \begin{bmatrix} R \\ G \\ B \end{bmatrix}$$

This equation is solved to obtain Sr, Sg, and Sb under the conditions that when R=G=B=1, white illumination light (W) (xy chromaticity coordinates=(xw, yw)) is realized (X=xw/yw, Y=1, Z=(1−xw−yw)/yw). The final conversion matrix M can therefore be obtained.

The spectral characteristics of each RGB color separation filter of the scanner are measured to obtain a matrix for converting a scanner color specification system into an XYZ color specification system. The 3×3 matrix can be obtained through matrix calculation (M$^{-1}$×S). If the color temperature of illumination light is different from that of the monitor, a chromatic adaptation prediction equation of Von Kriese is used to correct the 3×3 matrix so as to generally match the hue of the image on the monitor with that of the image printed out on a recording sheet.

A monitor gamma correction circuit 217-4 corrects monitor non-linearity called the gamma characteristics, and performs the following calculations by using a LUT.

$R3 = 255*((R2 - Roffset)/255)^{(1/\gamma)}$ $G3 = 255*((G2 - Goffset)/255)^{(1/\gamma)}$ $B3 = 255*((G2 - Boffset)/255)^{(1/\gamma)}$ where Roffset, Goffset, and Boffset are offset components of R, G, and B (light emission amount at a luminance set value of 0 and components of illumination light reflected from the monitor and entering eyes).

The gamma characteristics change with the luminance of a monitor, and the gamma characteristics sensed by a user depend on the environments such as illumination. Therefore, a gamma value is not preferable if it is fixed to a certain value. A plurality of conversion tables having gamma values set in the range from 1 to 3 at an interval of 0.1 are stored in advance in ROM. By selecting correction data at a desired gamma value, a user can set an optimum gamma value while viewing the monitor.

In the above manner, a user can finely adjust the R2, G2, and B2 corrected by the 3×3 monitor color correction 217-3 in accordance with the characteristics and environment conditions of the monitor 219, through the monitor gamma correction.

In FIG. 19, the density value corresponds to the gamma value.

In this embodiment, parameters for the preview process can be set from the operation unit of the copier.

A display editing circuit 217-5 performs various editing processes for the image data displayed on the monitor and controls the monitor.

Figure 8:
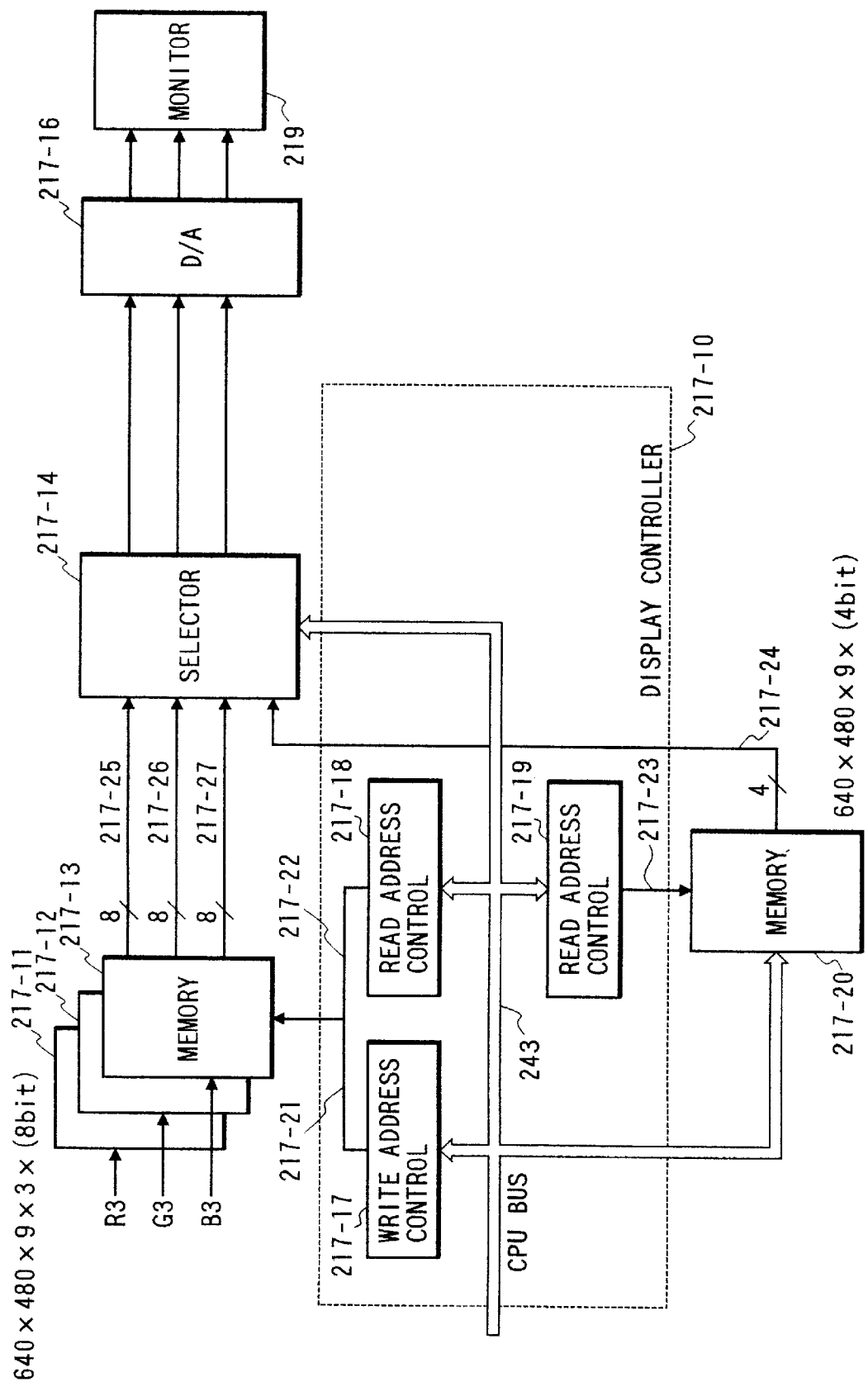
FIG. 8 is a diagram showing an example of the structure of a display editing circuit of the first embodiment.

FIG. 8 shows the details of the display editing circuit which is roughly divided into a read image processing section and an additional information adding section for adding a frame, character, or the like to the image.

R3, G3, and B3 data after the monitor gamma correction by the monitor gamma correction circuit 217-4 are supplied to memories 217-11, 217-12, and 217-13. Start and end addresses in X and Y directions can be set via the CPU bus 243 to a writing address control circuit 217-17 of a display controller 217-10 which supplies an address signal 217-21 so that data can be written starting from a desired location of each memory. In this embodiment, the memory size of each color is 640×480×9×(8 bits).

The original image size can be reduced when the image data is stored in the memory, the magnification factor being set by CPU 240. In accordance with whether the image is horizontally or vertically long, the writing address control circuit 217-17 can operate to rotate the image as desired. In this case, the area outside of the start and end addresses, i.e., the area where an image is not written, has the previous image or the fixed display color. Therefore, in this embodiment, CPU 240 can control to display the area other than the writing area with a desired color.

CPU can set arbitrary coordinate values to a reading address control circuit 217-18 to read the image data in the memory at desired locations and display it on the monitor. This designation can be performed in real time, by using a touch panel key of the operation unit to be described later. Since the image size of the monitor of this embodiment is 640×480 dots, it is necessary to thin the image in order to display the whole image stored in the memory. A thinning factor can be set by CPU. In this embodiment, as will be later described, an operator can select one of a full mode of displaying the whole image stored in the memory, a twofold mode of displaying 4/9 the image stored in the memory, and a threefold mode of displaying 1/9 the image stored in the memory.

A memory 217-20 is used for adding information such as figures and characters to the image and has a size of 640×480×9×(4 bits) which allows to independently develop figures and characters of four frames.

In this embodiment, although the data is developed directly on the memory by CPU 240, it may be developed by a dedicated controller capable of developing data at high speed, such as AGDC. The reading address control circuit 217-19 can set a reading start location and a thinning factor, similar to the reading address control circuit 217-18.

The data read from the memories is input to a selector 217-14. If a signal 217-24 read from the memory 217-20 is "L", the selector outputs the image data itself 217-25 to 217-27, and if the signal is "H", it outputs R, G, and B (8 bits) data of four frames. These R, G, and B data can be set by CPU 240 and a desired color is given to the figures and characters in each of the four fields.

The signal output from the selector 217-14 is converted into an analog signal by a D/A converter 217-16 to display a final image on a monitor 219.

<Operation Unit>

Figure 11:
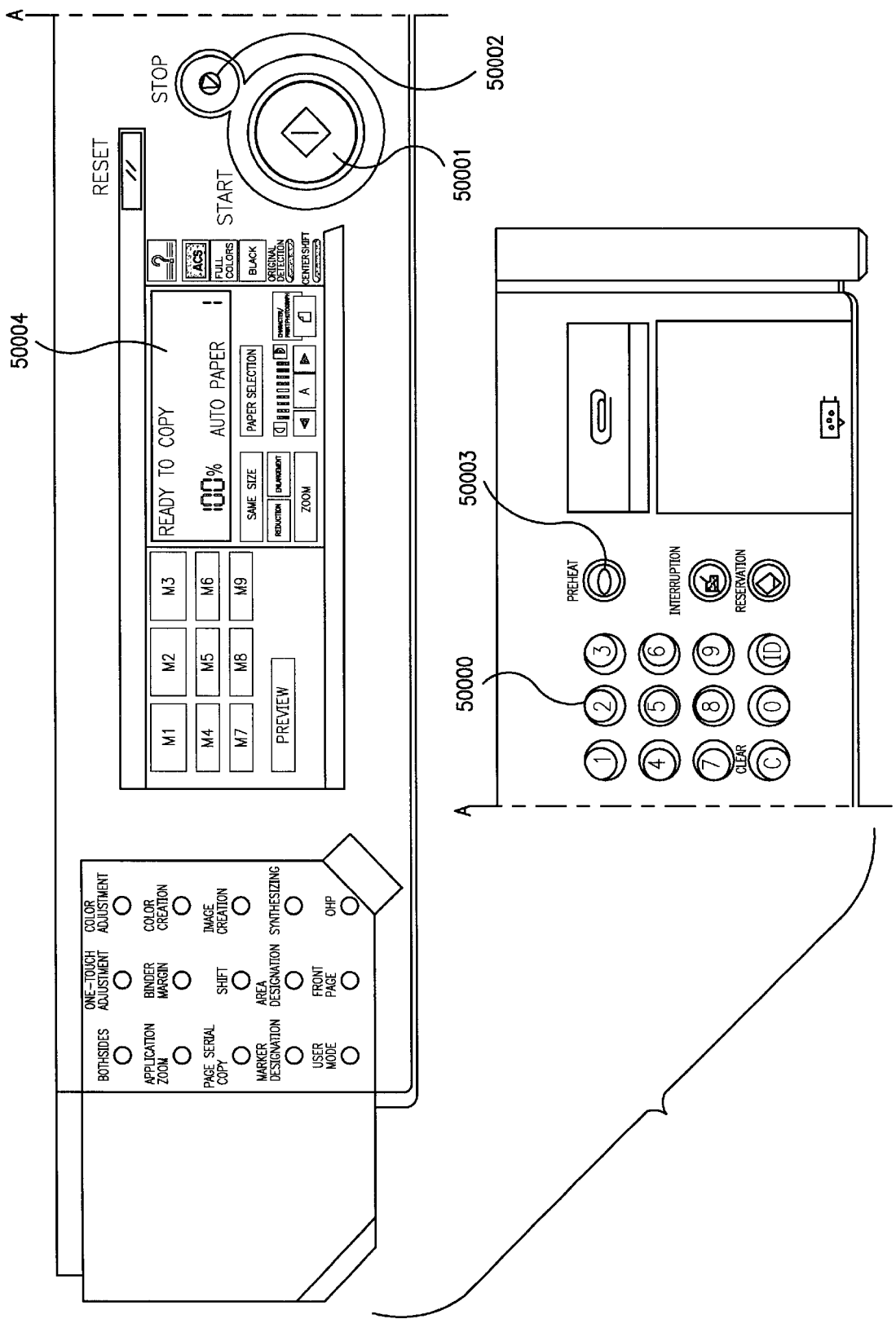
FIG. 11 is a diagram showing an example of the whole of an operation unit of the first embodiment.

FIG. 11 shows an outer appearance of the operation unit. Reference numeral 50000 represents numerical keys, reference numeral 50001 represents a copy start key, reference numeral 50002 represents a stop key, reference numeral 50003 represents a remaining heat key, and reference numeral 50004 represents a display unit constituted by a liquid crystal display and a touch panel.

Figure 12:
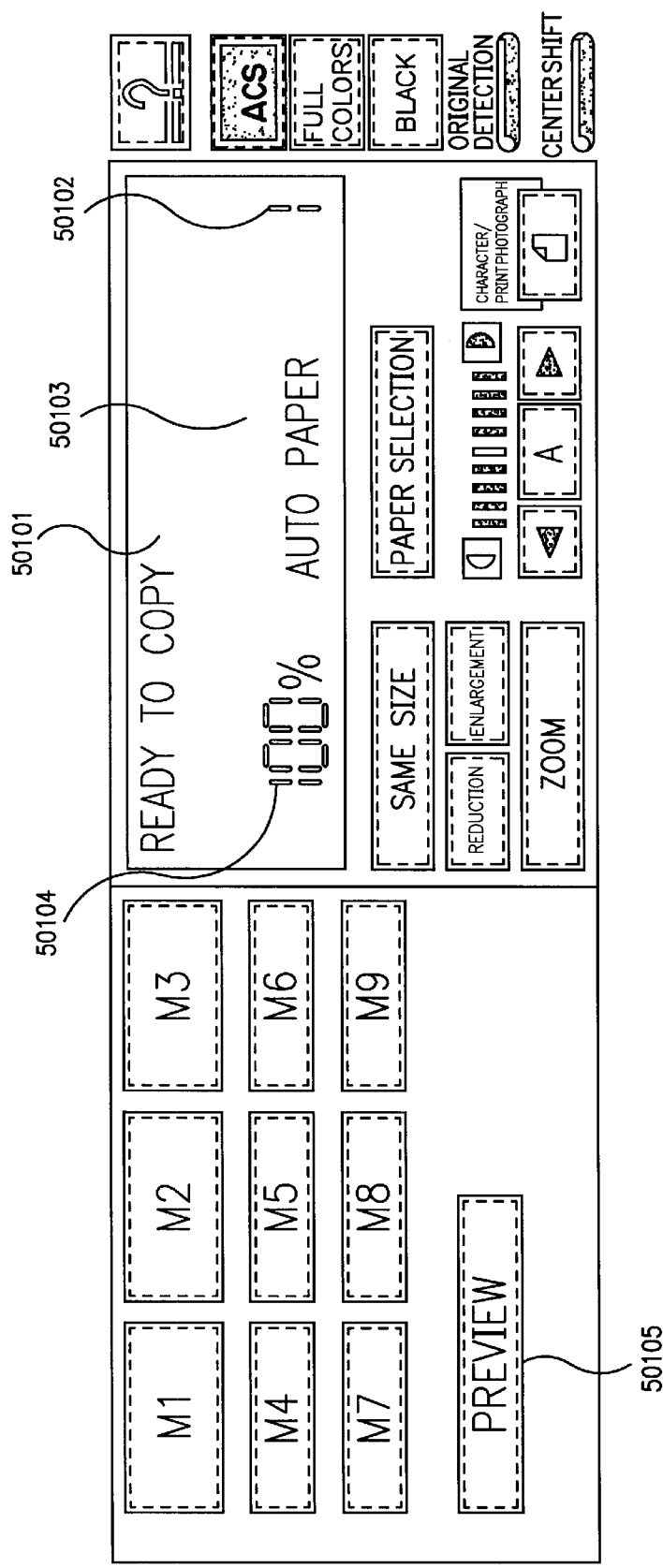
FIG. 12 is a diagram showing an example of a display on an operation screen of the first embodiment.

A standard screen on the display unit 50004 is shown in FIG. 12.

In the standard screen shown in FIG. 12, reference numeral 50101 represents a display of whether a copy is ready or not. Reference numeral 50102 represents a display of the set number of copies, reference numeral 50103 represents a display of a selected paper size, and reference numeral 50104 represents a display of a copy magnification. Reference numeral 50105 represents a touch key for designating a preview mode.

Prior to starting the preview mode, an operator designates from the operation unit, an image magnification, a paper size, and an editing process, and depresses a preview mode key 50105. The screen on the display unit changes from the standard screen to a preview operation screen.

Figure 13:
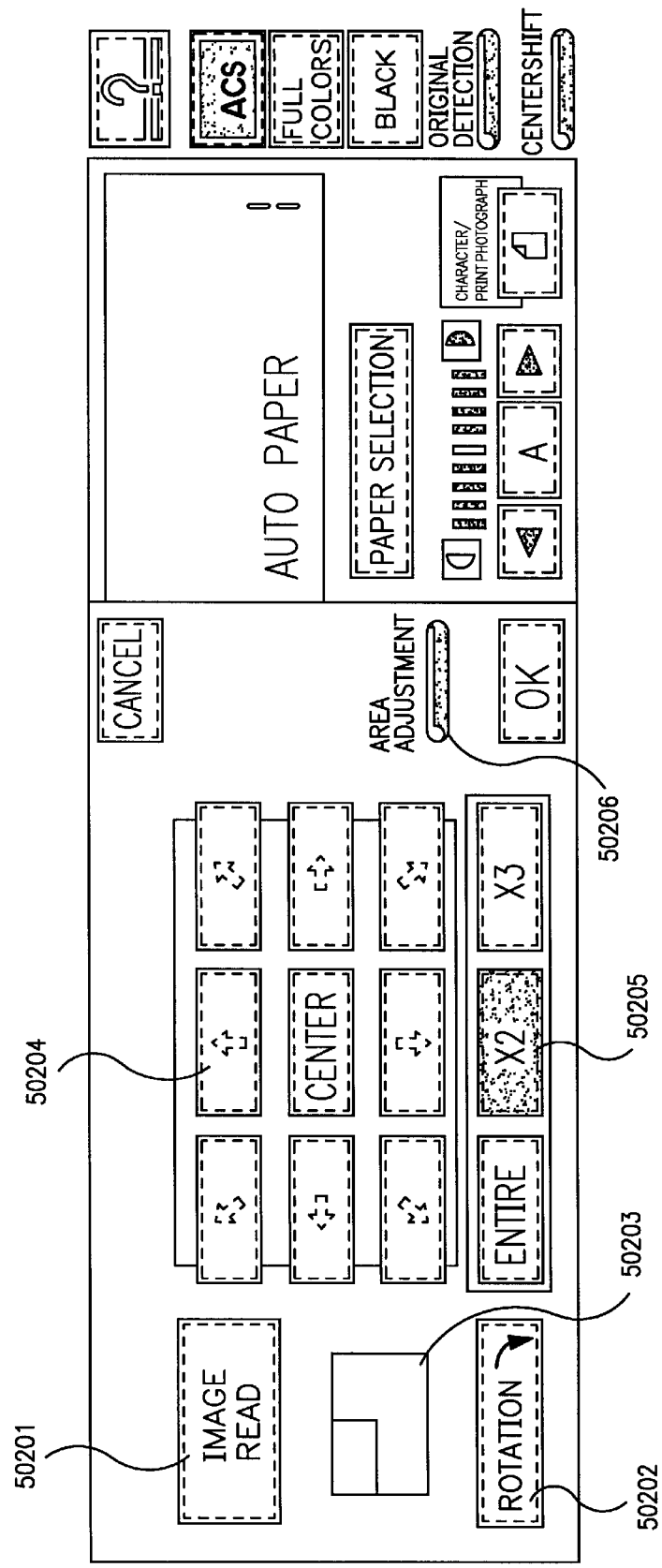
FIG. 13 is a diagram showing an example of a display on an operation screen of the first embodiment.

FIG. 13 shows an example of the preview operation screen. Reference numeral 50201 represents a preview start key (image read key) for previewing an original, reference numeral 50202 represents display direction setting keys for setting the direction of an image on CRT 219, reference numeral 50203 represents an area monitor for displaying the area of the displayed image, reference numeral 50204 represents display position setting keys for setting the area of the image to be displayed, reference numeral 50205 represents display magnification setting keys, and reference numeral 50206 represents an area adjusting key.

An operator first sets an original on an original support or feeder 11 and the display direction (vertical or horizontal) of the original is set with the display direction setting key 50202. With the ordinary display direction, the original image starting from the original abutting position of the original support is displayed at the upper right of CRT 219. As the display direction setting key 50202 is depressed, the display of the display direction setting key is changed between white and black, and the image rotated by 90 degrees is written in the display memories 217-11 to 217-13. Therefore, the original image rotated by 90 degrees relative to the original abutting position of the original support is displayed on CRT 219.

When the operator depresses the preview start key 50201, the original is transported from the feeder to the original support if the original is set to the feeder, and a pre-scan is performed to detect the original size and position on the original support if the original detecting mode is set. Thereafter, a scan operation starts reading the original. The read image is subjected to various editing processes and supplied to the preview processing unit 217 whereat it is converted into RGB signals and written in the image memories 217-11 to 217-13 by calculating the most efficient size allowing the whole image to be stored therein, in accordance with the set display direction, display magnification, original size, and the like. The data in the image memories 217-11 to 217-13 is corrected by LUT 217-4 in accordance with the CRT characteristics and transferred to the display controller 217-10 to display a preview image on CRT.

The capacity of each image memory 217-11 to 217-13 is 1920×1440 pixels which is nine times as large as the size of 640×480 pixels of CRT. Therefore, when the data is transferred from the image memories to CRT, it is necessary for the display controller 217-10 to change the size of the data in the image memories 217-11 to 217-13 in accordance with the display size of CRT and the display magnification set with the display magnification setting key 50205.

Figure 17:
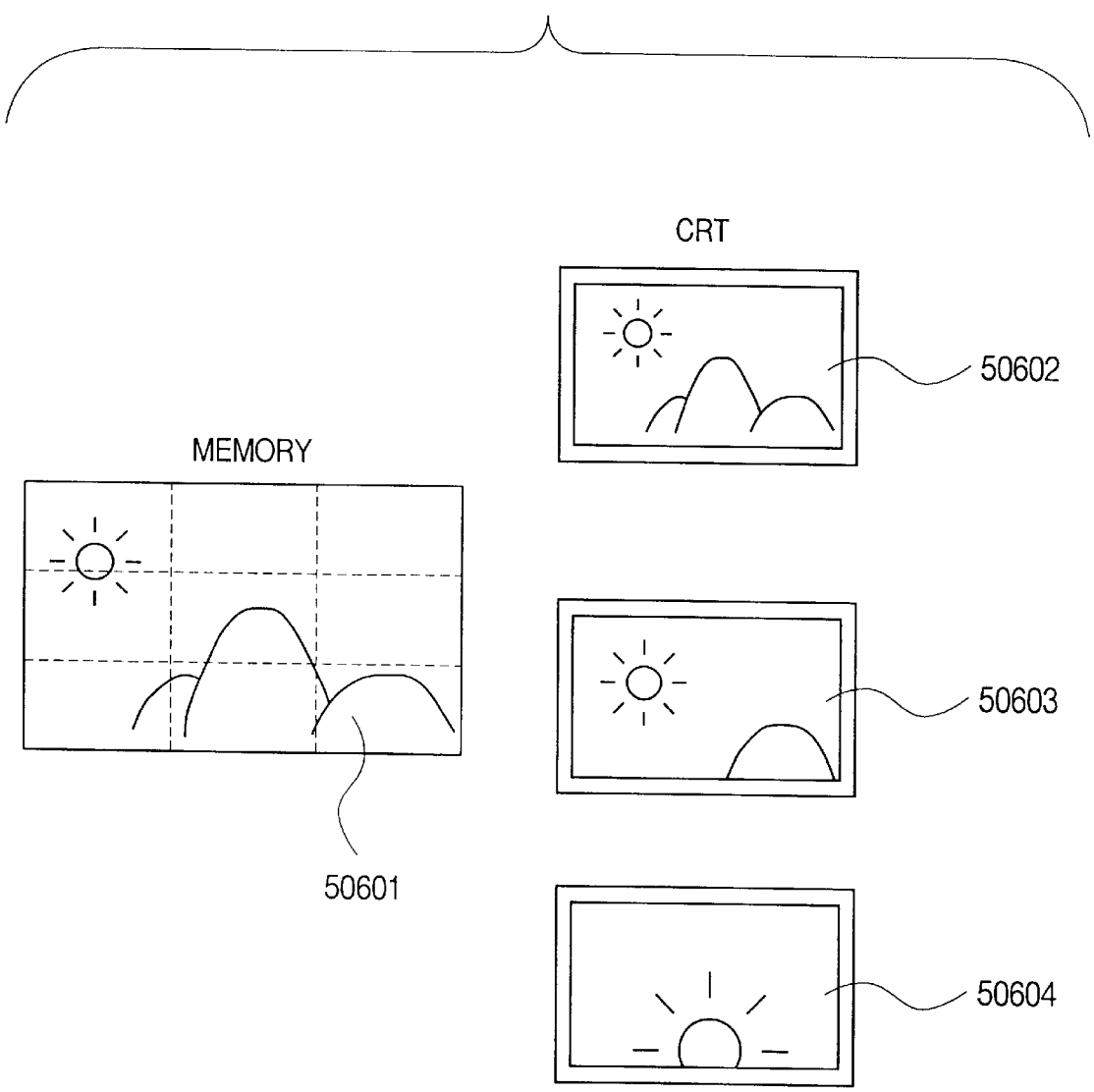
FIG. 17 is a diagram showing an example of a display of a preview image of the first embodiment.

Specific examples are shown in FIG. 17. Data indicated at 50601 is being stored in the image memories 217-11 to 217-13. If the "whole" key among the display magnification keys is set, the whole data area in the image memories 217-11 to 217-13 is reduced by 1/9 by the display controller 217-10 and displayed on CRT as indicated at 50602. If the "two times (twofold)" key is depressed, the data in a 4/9 area of the whole area in the image memories 217-11 to 217-13 is reduced by 1/4 by the display controller 217-10 and displayed on CRT as indicated at 50603. Namely, the data in a partial area in the image memories 217-11 to 217-13 is enlarged by two times as compared to the display of the whole area. Similarly, if the "three times (threefold)" key is depressed, the data in a 1/9 area of the whole area in the image memories 217-11 to 217-13 is directly transferred to display it on CRT as indicated at 50604, this image in the 1/9 area being enlarged by three times as compared to the display of the whole area.

If the twofold or threefold is set with the display magnification setting key, part of the data in the image memories 217-11 to 217-13 is displayed on CRT. In this case, if the reading address is changed and the data is transferred to CRT, the area not displayed before can be displayed. Specifically, in the case of the twofold set with the display magnification setting key, an arbitrary image corresponding to the 1/4 area in the image memories is displayed on CRT. In this case, each time the downward arrow key among the display position setting keys 50304 is depressed, the reading start position of the image memories move downward by four dots and the image in the 1/4 area from the reading start position is transferred to CRT. Therefore, the image at the lower area of the screen not displayed before can be displayed. If the image read from the memories contains one side edge of the whole image and the reading start position is moved to this side edge at the next time, the image is outside of the image memories. Therefore, in order to notify the operator of that the image cannot be moved to this side, the display position setting key toward this side is displayed with cross hatching. In order to notify the operator of the partial area displayed on CRT, this area is displayed on the area monitor 50302.

<Area Correction in Preview>

If the operator sets the area designation mode, a preview image with the area designated is displayed. If the position and size of the designated area are different from those intended by the operator, or if the processed color of the image in the designated area is something different from that intended by the operator, the position and size of the designated area or the processed color can be finely adjusted and corrected on the preview screen.

As the operator depresses the area adjustment key 50206 after the preview, the display unit selects the area selecting screen. When the area selecting screen (FIG. 14) is selected, the size and position of the outer frame of the whole area are calculated from the copy magnification, display magnification, display direction, and the like. The area generating unit 220 generates an image of the outer frame which is developed on an area screen memory 1 (hereinafter called a plane memory 1) and transferred to an area display memory 1 (hereinafter called a plane memory 1') to display it on CRT. This area outer frame is displayed on the currently displayed preview image. The area outer frame is displayed in the color set to the plane memory 1. The plane memories are formed in a divided field of the memory 217-20.

The plane memory 1 has a capacity several times larger than the display size of CRT. In accordance with a magnification set with the image magnification setting key and the display position set with the display area setting key, the transfer area and magnification of the plane memory 1 are calculated and transferred to the plane memory 1'. Therefore, each time the image display magnification setting and display area setting are changed, the area outer frame is displayed in correspondence with the changed preview screen.

Figure 18:
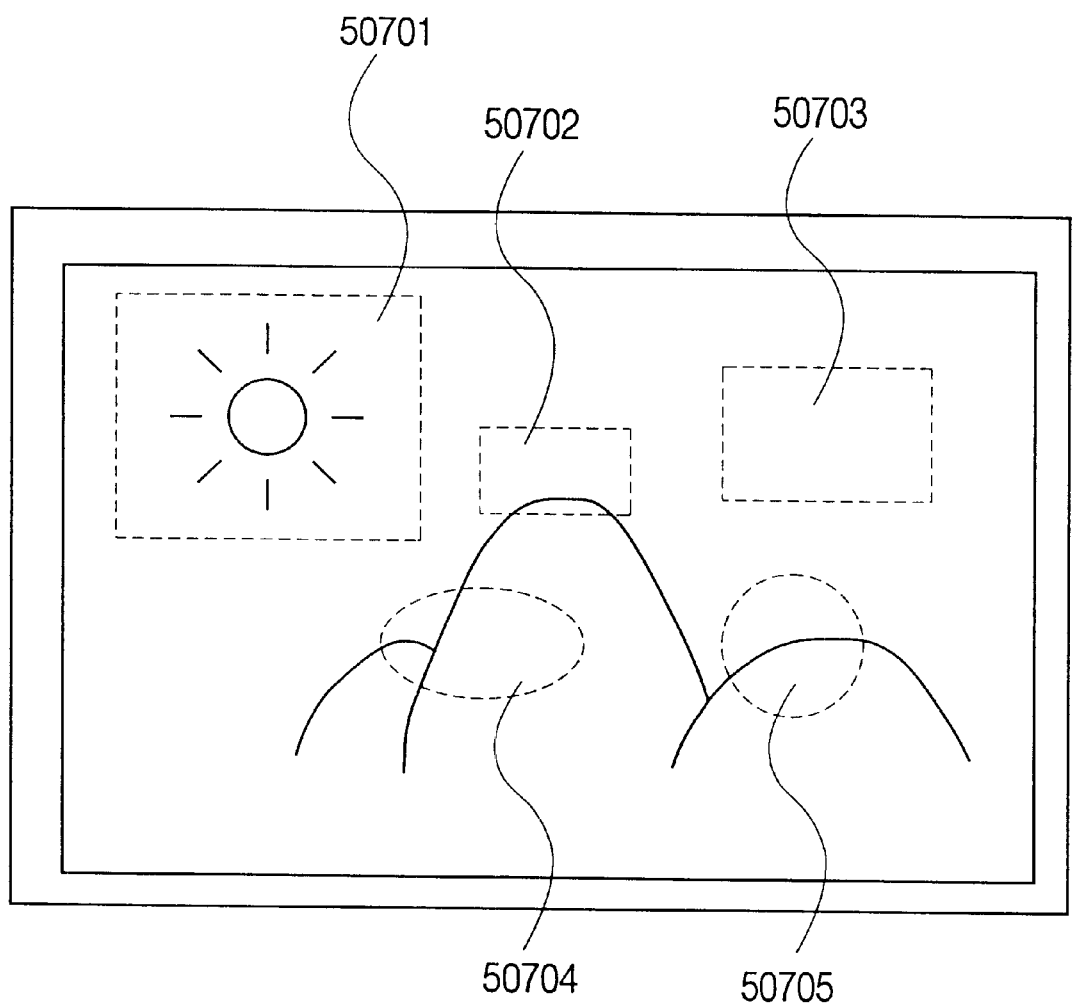
FIG. 18 is a diagram showing an example of a display of a preview image of the first embodiment.

In this area process, the process contents of thirty types at a maximum can be set. Fifteen areas at a maximum can be set per each process. For example, in FIG. 18 showing an example of the preview image with a plurality of designated areas, the first area process performs a paint process for three areas including a first area 50701, a second area 50702, and a third area 50703, and the second area process performs a color conversion process for two areas including a fourth area 50704, and a fifth area 50705.

In the case where a plurality of areas are designated, an operator is required to identify each area by an area process number setting key and an area number setting key.

Figure 14:
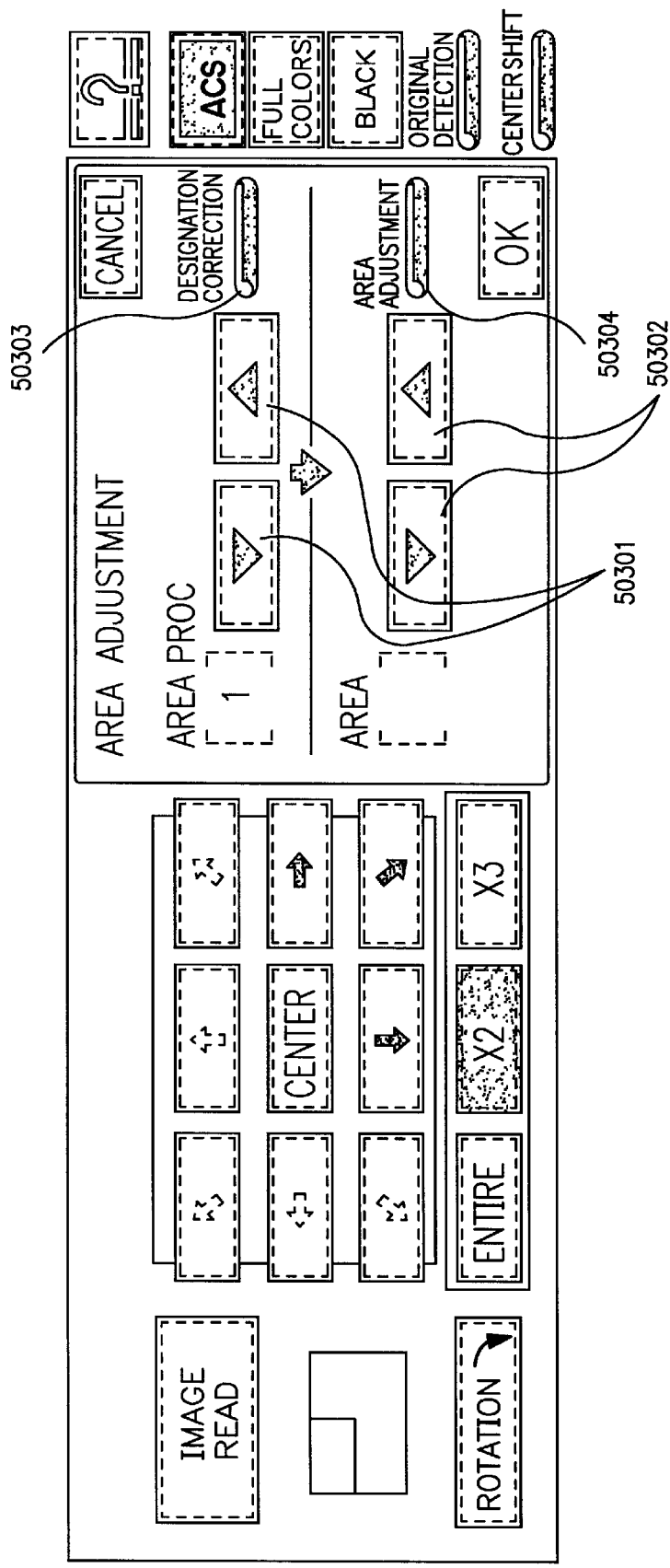
FIG. 14 is a diagram showing an example of a display on an operation screen of the first embodiment.

As the area adjustment key 50206 shown in FIG. 13 is depressed, the screen shown in FIG. 14 is displayed. A desired area process number is selected by depressing an up-key and a down-key of the area process number setting keys 50301. Assuming that the first area process is selected, the outer frames (60701, 50702, 50703) of the areas of the first area process are calculated in the manner described above, and the area generating unit 220 forms the outer frame image on an area image memory 2 (hereinafter called a plane memory 2). This outer frame image is enlarged or reduced by the magnification designated by the display magnification setting key and transferred to an area display memory 2 (hereinafter called a plane memory 2') to display it on CRT in a color different from that set to the plane memory 1'. Since the display colors set to the plane memories 1' and 2' are different, the area process designated from a plurality of area processes can be identified basing upon a different color display on CRT. As the area process number 2 is designated by depressing the up-key of the area process number setting key 50301, the outer frame image of the first area process written in the plane memory 2 is deleted, and the outer frame image of the second area process is written and displayed on CRT.

Figure 15:
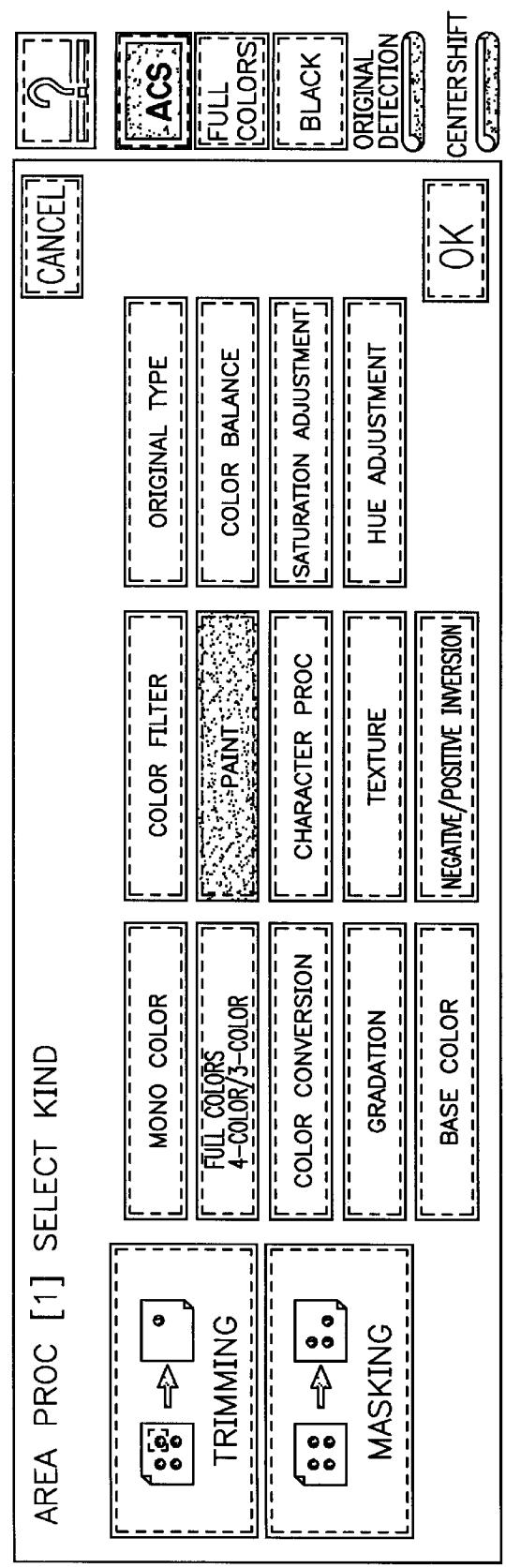
FIG. 15 is a diagram showing an example of a display on an operation screen of the first embodiment.

As the operator depresses a setting correction key 50303 after the area process whose process contents are to be changed, is identified in the above manner, the screen shown in FIG. 15 is displayed. The process contents can be changed by selecting a desired process on this screen.

If the size of an area is to be changed, the number of the area process containing an area to be changed is selected with the area process number setting key 50301 and the area to be changed is selected with the area number selecting key 50302, in the manner described above. For example, if the fifth area 50705 of the second area process is to be moved left by 1 cm, the second area process is selected by the area process number setting key. Next, as the area number setting key is depressed, the fourth area 50704 of the second area process is selected. At this time, the area generating unit 220 develops the outer frame image of the fourth area on the area image memory (hereinafter called a plane memory 3). The outer frame image developed on the plane memory 3 is transferred to an area display memory 3 (hereinafter called a plane memory 3') to display it on CRT. The color displayed on CRT is different from the colors set to the plane memories 1' and 2'. The priority order of each area display memory is plane memory 1'<plane memory 2'<plane memory 3'. Therefore, even if the operator does not memorize the number of the area process to be changed, the area process designated among all the area processes can be identified and the area to be changed can be identified.

If the fifth area 50705 is selected by the area number setting key, the outer frame image of the fourth area 50704 on the plane memory 3' is deleted and the outer frame image of the fifth area is written therein to display it on CRT.

As the operator depresses the area correction key 50304 after the area whose size it to be changed, is designated, the area size correction screen is displayed.

Figure 16:
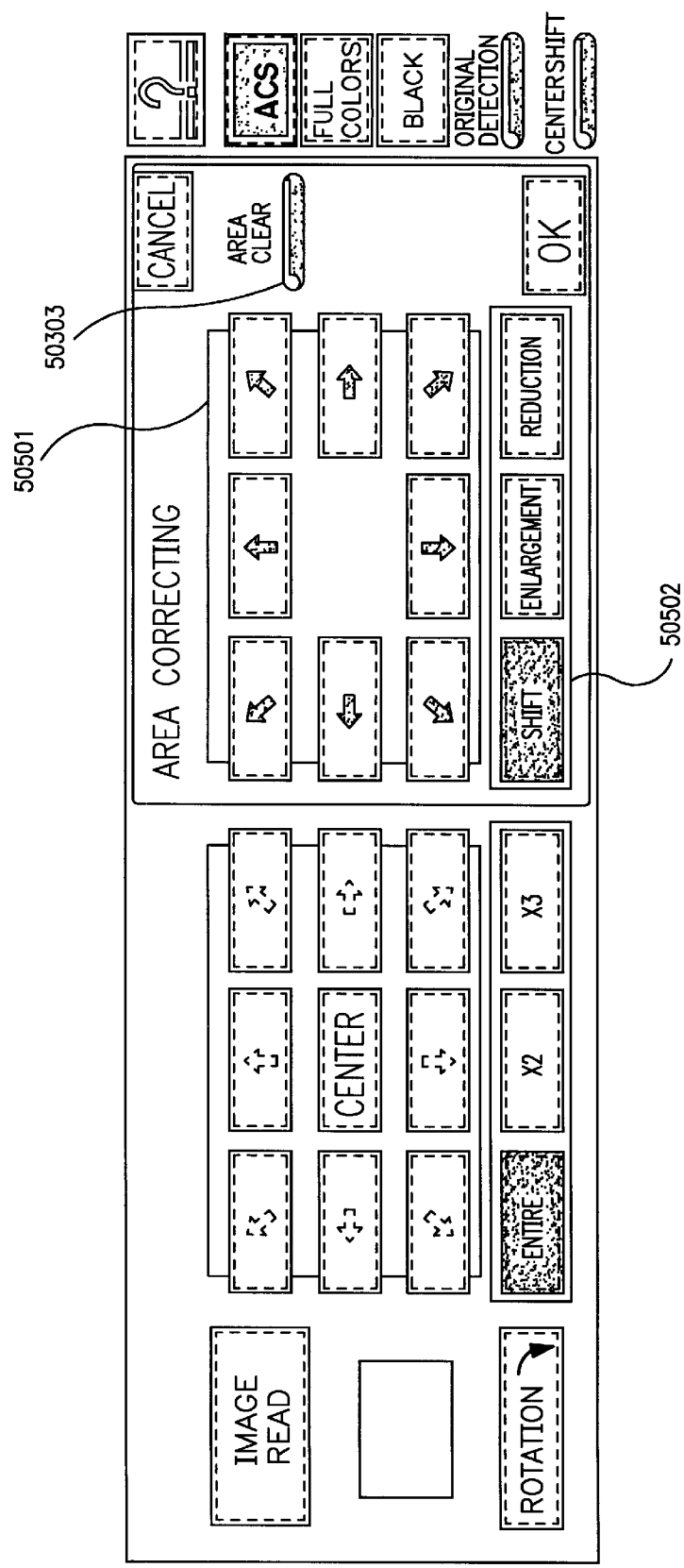
FIG. 16 is a diagram showing an example of a display on an operation screen of the first embodiment.

FIG. 16 shows the area size correction screen. Reference numeral 50501 represents area correction keys for designating the direction of moving an area, reference numeral 50502 represents area correction setting keys for setting the type of area correction, and reference numeral 50503 represents an area clear key.

For example, if the fifth area is to be moved left, the operator first designates a move key among the area correction setting keys 50502. Then, the left arrow key among the area correction keys 50501 is depressed. At this time, the outer frame image of the fifth area stored in the plane memory 3 is cleared and the outer frame image moved left by four pixels is formed on the plane memory 3 and transferred to the plane memory 3' to display it on CRT. In this manner, the designated area moves on the preview display screen. The motion amount is fed back to CPU so that when the image read key is again depressed to perform the preview, the image is processed in accordance with the changed area position. In this manner, the area can be moved while viewing the designated area on the preview display screen. Similar to the above, if the area size is to be changed, the operator selects an enlargement key or reduction key among the area correction setting keys 50502 and depresses the arrow key among the area correction keys 50501, and so the area is enlarged or reduced in the direction of the depressed key.

After the size, position, or contents of an area is corrected while viewing the preview display screen and an image desired by the operator can be displayed on CRT, the start key 50001 is depressed to print out the image.

<Modification of First Embodiment>

A modification of the first embodiment will be described with reference to FIG. 20.

In this modification, a user manually selects an image processing mode from the operation unit. The image processing mode includes, for example, the following modes.

1) Modes associated with the type of image
 (i) Character mode: in this mode, only characters are processed and black color is reproduced with high fidelity.
 (ii) Print photograph mode: in this mode, an original having many half tone images such as a photograph is processed and half tone is reproduced with high fidelity.
2) Modes associated with user customization
 (iii) Background removal mode: in this mode, a background of an original is removed.

Figure 20:
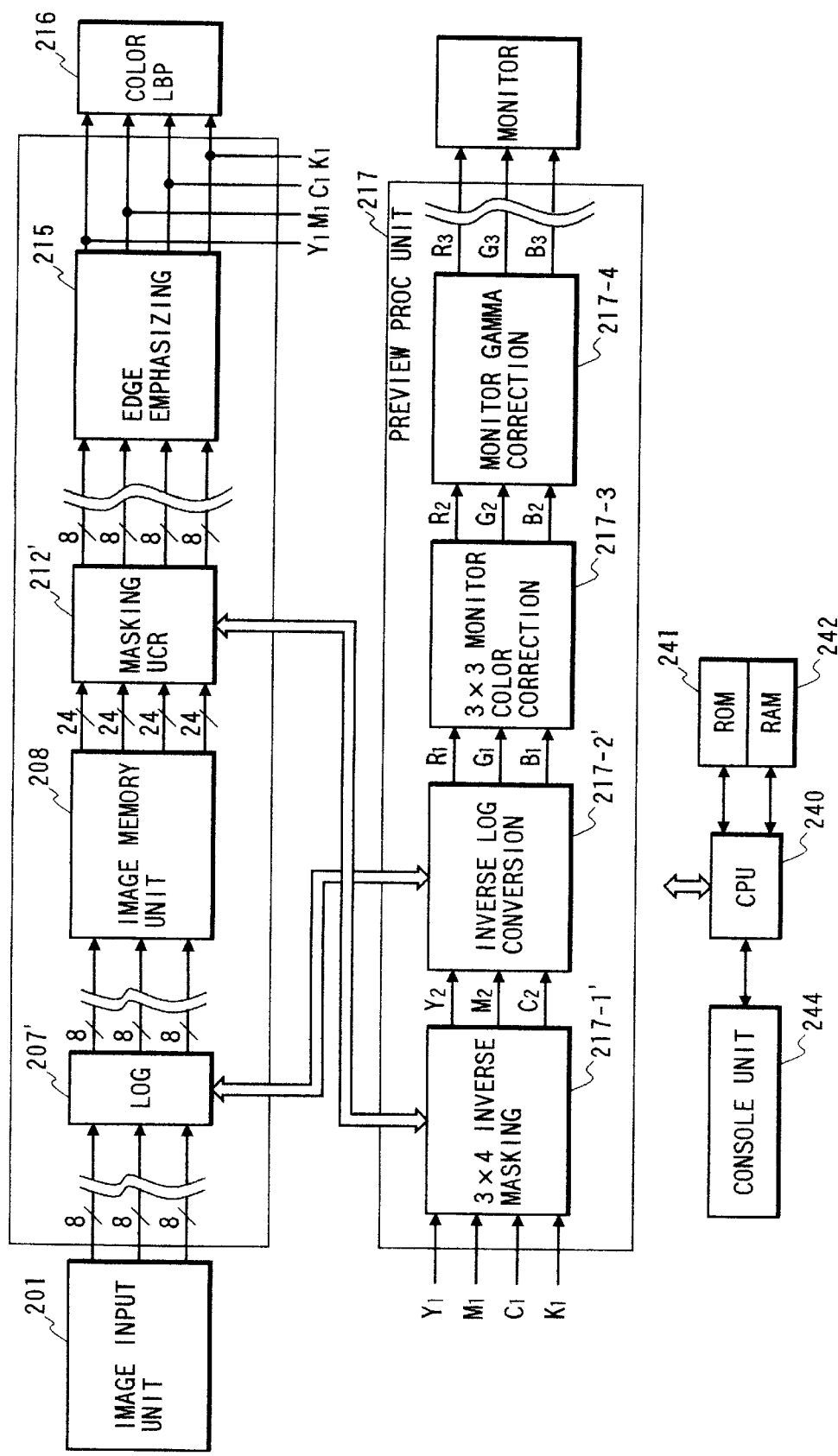
FIG. 20 is a diagram showing an example of the structure of an image processing apparatus according to a second embodiment of the invention.

In the image processing apparatus shown in FIG. 20, the modes associated with the type of image, the character mode (i) and print photograph mode (ii), are performed by a masking UCR 212' whose coefficients are set by CPU 240. The background removal mode (iii) is performed by a LOG 207' whose LUT is changed by CPU 240.

Specifically, in the image processing apparatus shown in FIG. 20, the process to be executed by the LOG 207' and masking UCR 212' changes with the image processing mode designated by the operation unit 244.

Therefore, the process to be executed by a 3×4 inverse masking 217-1' and an inverse LOG 217-2' for matching the hues of an output image and a display image change with the process to be executed by the masking UCR 212' and LOG 207' which changes with the image processing mode.

As described above, in this modification, the hues of an output image and a display image can be matched at any image processing mode. Namely, a final image processed by a designated image processing mode can be confirmed from the preview image.

In the above embodiment, the color temperature and coloring conditions of the monitor and illumination light set by the operation unit are reflected upon the matrix coefficients of the 3×3 monitor color correction unit 217-3. The invention is not limited only to this arrangement. For example, a correction circuit for each factor may be independently provided and its coefficients are changed in accordance with each setting condition.

(Second Embodiment)

A method of correcting an area by using a preview image according to the second embodiment will be described.

The structure of each constituent of a copier of this embodiment is the same as the first embodiment.

<Area Correction in Preview>

If the operator sets the area designation mode, a preview image with the area designated is displayed. If the position and size of the designated area are different from those intended by the operator, or if the processed color of the image in the designated area is something different from that intended by the operator, the position and size of the designated area or the processed color can be finely adjusted and corrected on the preview screen.

As the operator depresses the area adjustment key 50206 after the preview, the display unit selects the area selecting screen. When the area selecting screen is selected, a preview image of all areas designated by the area designation function is displayed, with the outer frame and image of each area being synthesized, as shown in FIG. 17.

Each area is generated by the area generating unit 220 under the control of CPU 240 in response to a designation by a digitizer, and the area data is stored in the area memory unit 238. The size and position of an outer frame of each area are calculated from the copy magnification, display magnification, display direction, and the like, and the outer frame data is stored in the memory 217-20.

The memory 217-20 is divided into a plurality of area display memories (plane memories) which are independently used according to each process.

In displaying a preview image with the outer frame and image of each area being synthesized, the area generating unit 220 generates an image of the outer frame which is developed on an area screen memory 1 (hereinafter called a plane memory 1) and transferred to an area display memory 1 (hereinafter called a plane memory 1').

The memory 217-20 has a capacity several times larger than the display size of CRT. In accordance with a magnification set with the image magnification setting key and the display position set with the display area setting key, the transfer area and magnification of the plane memory 1 are calculated and transferred to the plane memory 1', similar to the preview image.

Therefore, each time the image display magnification setting and display area setting are changed, the area outer frame is displayed in correspondence with the changed preview screen.

The outer frame of each area stored in the plane memory 1' and the image stored in the memories 217-11, 217-12, and 217-13 are synthesized by the selector 217-14 with the help of both the read address controllers 217-18 and 217-19.

When the selector 217-14 synthesizes the outer frame and image, CPU can set an arbitrary color to the outer frame of each area. Specifically, when the signal 217-24 of "H" is input, R, G, and B data preset by CPU 240 as the outer frame data is synthesized with the image.

As above, by using the plane memories 1 and 1' capable of storing outer frames of all areas, the outer frames of all areas and images can be synthesized.

In this area process, the process contents of thirty types at a maximum can be set. Fifteen areas at a maximum can be set per each process. For example, in FIG. 16 showing an example of the preview image with a plurality of designated areas, the first area process performs a paint process for three areas including a first area 50701, a second area 50702, and a third area 50703, and the second area process performs a color conversion process for two areas including a fourth area 50704, and a fifth area 50705.

In the case where a plurality of areas are designated, an operator is required to identify each area by an area process number setting key and an area number setting key.

As the area adjustment key 50206 shown in FIG. 11 is depressed, the screen shown in FIG. 12 is displayed. A desired area process number is selected by depressing an up-key and a down-key of the area process number setting keys 50301. Assuming that the first area process is selected, the outer frames (50701, 50702, 50703) of the areas of the first area process are calculated in the manner described above, and the area generating unit 220 forms the outer frame image on an area image memory 2 (hereinafter called a plane memory 2). This outer frame image is enlarged or reduced by the magnification designated by the display magnification setting key and transferred to an area display memory 2 (hereinafter called a plane memory 2') to display it on CRT in a color different from that set to the plane memory 1'. Since the display colors set to the plane memories 1' and 2' are different, the area process designated from a plurality of area processes can be identified basing upon a different color display on CRT. As the area process number 2 is designated by depressing the up-key of the area process number setting key 50301, the outer frame image of the first area process written in the plane memory 2 is deleted, and the outer frame image of the second area process is written and displayed on CRT.

As the operator depresses a setting correction key 50303 after the area process whose process contents are to be changed, is identified in the above manner, the screen shown in FIG. 15 is displayed. The process contents can be changed by selecting a desired process on this screen.

If the size of an area is to be changed, the number of the area process containing an area to be changed is selected with the area process number setting key 50301 and the area to be changed is selected with the area number selecting key 50302, in the manner described above. For example, if the fifth area 50705 of the second area process is to be moved left by 1 cm, the second area process is selected by the area process number setting key. Next, as the area number setting key is depressed, the fourth area 50704 of the second area process is selected. At this time, the area generating unit 220 develops the outer frame image of the fourth area on an area image memory 3 (hereinafter called a plane memory 3). The outer frame image developed on the plane memory 3 is transferred to an area display memory 3 (hereinafter called a plane memory 3') to display it on CRT. The color displayed on CRT is different from the colors set to the plane memories 1' and 2'.

The priority order of each area display memory is plane memory 1'<plane memory 2'<plane memory 3'. Therefore, even if the operator does not memorize the number of the area process to be changed, the area process designated among all the area processes can be identified and the area to be changed can be identified.

If the fifth area 50705 is selected by the area number setting key, the outer frame image of the fourth area 50704 on the plane memory 3' is deleted and the outer frame image of the fifth area is written therein to display it on CRT.

As the operator depresses the area correction key 50304 after the area whose size it to be changed, is designated, the area size correction screen shown in FIG. 16 is displayed.

FIG. 16 shows the area size correction screen. Reference numeral 50501 represents area correction keys for designating the direction of moving an area, reference numeral 50502 represents area correction setting keys for setting the type of area correction, and reference numeral 50503 represents an area clear key.

For example, if the fifth area is to be moved left, the operator first designates a move key among the area correction setting keys 50502. Then, the left arrow key among the area correction keys 50501 is depressed. At this time, the outer frame image of the fifth area stored in the plane memory 3 is cleared and the outer frame image moved left by four pixels is formed on the plane memory 3 and transferred to the plane memory 3' to display it on CRT. In this manner, the designated area moves on the preview display screen. The motion amount is fed back to CPU so that when the image read key is again depressed to perform the preview, the image is processed in accordance with the changed area position. In this manner, the area can be moved while viewing the designated area on the preview display screen. Similar to the above, if the area size is to be changed, the operator selects an enlargement key or reduction key among the area correction setting keys 50502 and depresses the arrow key among the area correction keys 50501, and so the area is enlarged or reduced in the direction of the depressed key.

After the size, position, or contents of an area is corrected while viewing the preview display screen and an image desired by the operator can be displayed on CRT, the start key 50001 is depressed to print out the image.

<Display Color Change of Area Frame in Preview>

It is also possible to change the color of the area frame to the color a user desires. First, the area display color setting key is depressed to select the area display color setting screen.

Figure 21:
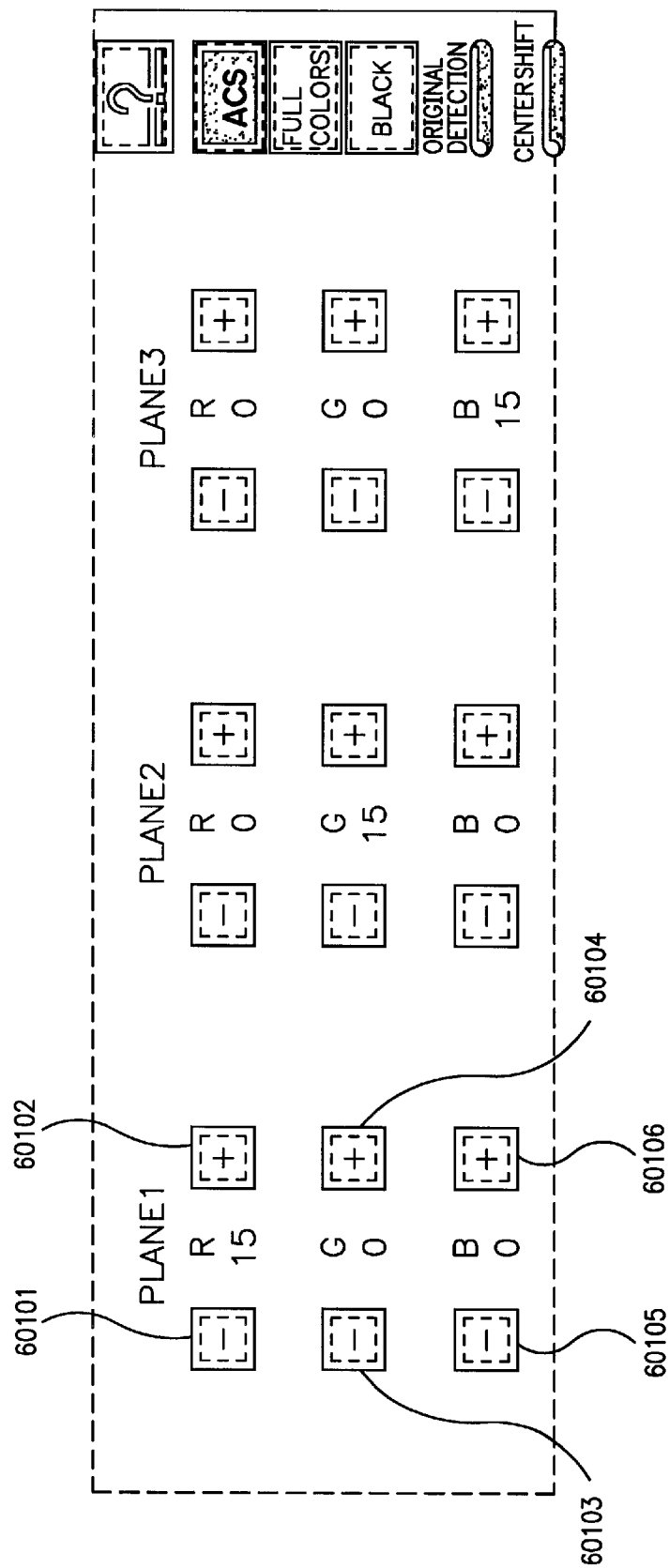
FIG. 21 is a schematic diagram showing an area display color setting screen of the second embodiment.

FIG. 21 shows the area display color setting screen. In FIG. 21, reference numerals 60101 and 60102 represent a key for setting an R component of the color of an area frame stored in Frame 1 or plane memory 1'. By increasing or decreasing the numerical value, one of 0 to 15 can be set. Similarly, reference numerals 60103 and 60104 represent a key for setting a G component of the plane memory 1', and reference numerals 60105 and 60106 represent a key for setting a B component of the plane memory 1'. Frame 2 and Frame 3 correspond to the plane memories 2' and 3'. Like Frame 1, keys are provided for setting the R, G, and B components of the color of each area frame.

In this example, the display color of the area frame of the plane memory 1' is set to red of 15, 0 and 0, the display color of the area frame of the plane memory 2' is set to green of 0, 15, and 0, and the display color of the area frame of the plane memory 3' is set to blue of 0, 0, and 15. An operator can call the area display color setting screen to set a desired color of the area frame in the plane memory.

The display colors of the area frames in the plane memories 1', 2', and 3' designated on the operation screen shown in FIG. 21 are stored in RAM 242 in correspondence with each plane memory.

The outer frame of each area may be displayed with a color corresponding to each area process. In this case, the color of each area process is set by the operation or console unit 244. In this manner, it is easy to recognize which area process is used by each area.

(Modification 1 of Second Embodiment)

If an original contains a variety of colors, it is difficult for an operator to set a color which can be easily distinguished from the original. If the display color of the area frame is set to an inverted color of the original, the range of an area can be easily distinguished for any color of the original.

The inverted display color of an area frame can be calculated from the following equations.

$$r'=255-r$$

$$g'=255-g$$

$$b'=255-b$$

where r', g', and b' are color components of the inverted display color of an area frame, and r, g, and b are color components of an image in the image memory corresponding to the area of the area frame.

In this embodiment, if the predetermined bit of the signal 217-24 from the memory 217-20 representative of the area frame is "H", CPU 240 processes the signals 217-25 to 217-27 from the memories 217-11, 217-12, and 217-13 representative of the color of the original, in accordance with the above equations.

Figure 22:
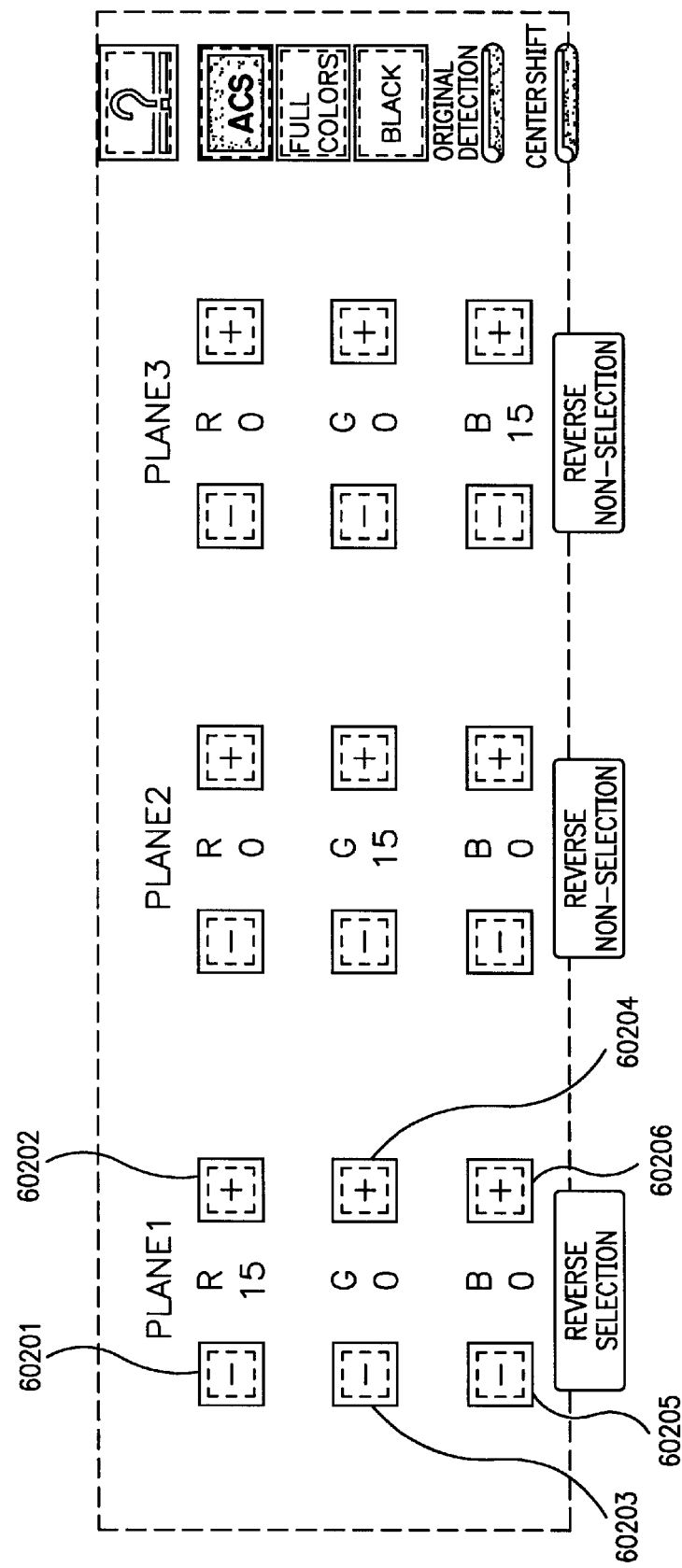
FIG. 22 is a schematic diagram showing an area display color setting screen according to a first modification of the second embodiment.

In order to distinguish a selected area from other areas, the selected area frame may be displayed with a specific color, with the other frame areas being displayed with inverted colors. Conversely, the selected area frame may be displayed with an inverted color, with the other frame areas being displayed with specific colors. For this setting, the area display color setting key is depressed to display the area display color setting screen (FIG. 22).

According to the first modification of the second embodiment, the color of the original at the area frame can be automatically inverted and the frame can be displayed with a color which can easily distinguish the area frame from the original.

Since whether or not the inversion process is performed for each plane memory can be manually selected, the display a user desires can be obtained.

(Second Modification of Second Embodiment)

The image processing of the second embodiment includes the color conversion process, paint process, and free color process, whereas the image processing of the second modification of the second embodiment includes additional processes of a masking process and a trimming process.

The masking process masks the inside of a designated area with white color. Namely, the inside of the designated area is changed to white. The masking process is performed by the color conversion unit 205.

The trimming process copies only the inside of the designated area. Namely, the inverse process of the masking process is performed by the color conversion unit 205.

Figure 23A:
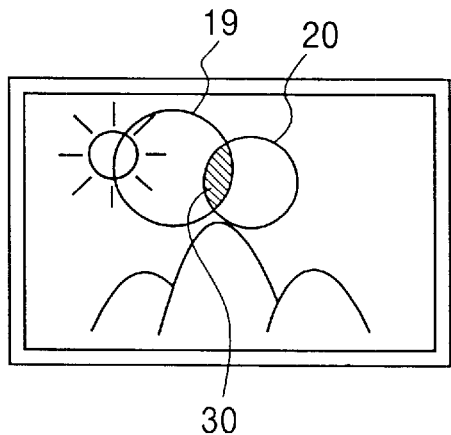
FIGS. 23A to 23D are schematic diagrams showing an area display color setting screen according to a second modification of the second embodiment.
Figure 23B:
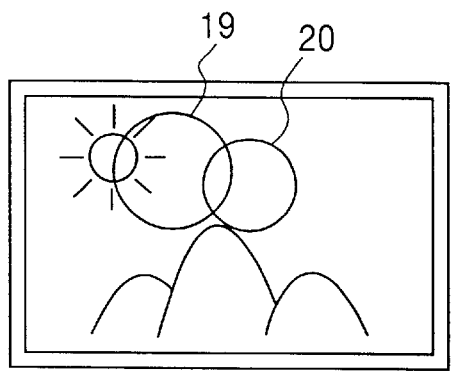

As shown in FIG. 23A, if the areas 19 and 20 are designated in an overlap manner, the frame display is changed with the contents of image processing of each area. For example, if the same pixel can be subjected to a plurality of processes as in the color conversion, paint, and free color processes, the frames are displayed as shown in FIG. 23B.

Figure 23C:
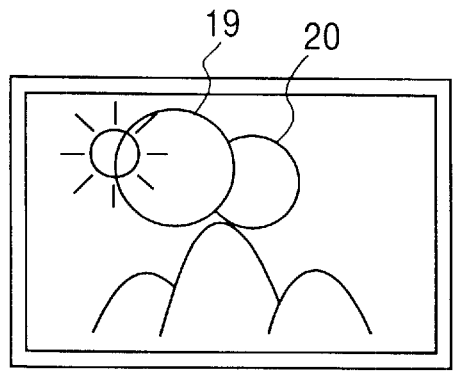

If the same pixel cannot be subjected to a plurality of processes as in the masking process, the frames are displayed as shown in FIG. 23C. Namely, if the masking process is set to the area 19 and the color conversion is set to the area 20, the color conversion cannot be performed for the area 20. Therefore, the frame of the area 20 is deformed to the frame of the area 21 and displayed as shown in FIG. 23C.

Figure 23D:
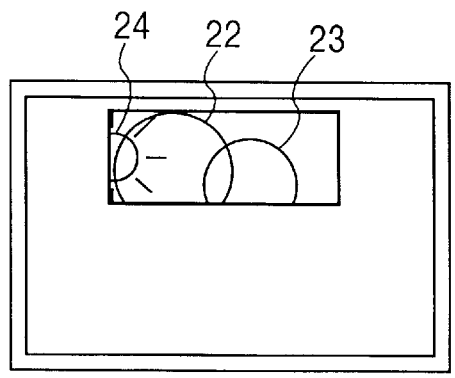
Figure 24:
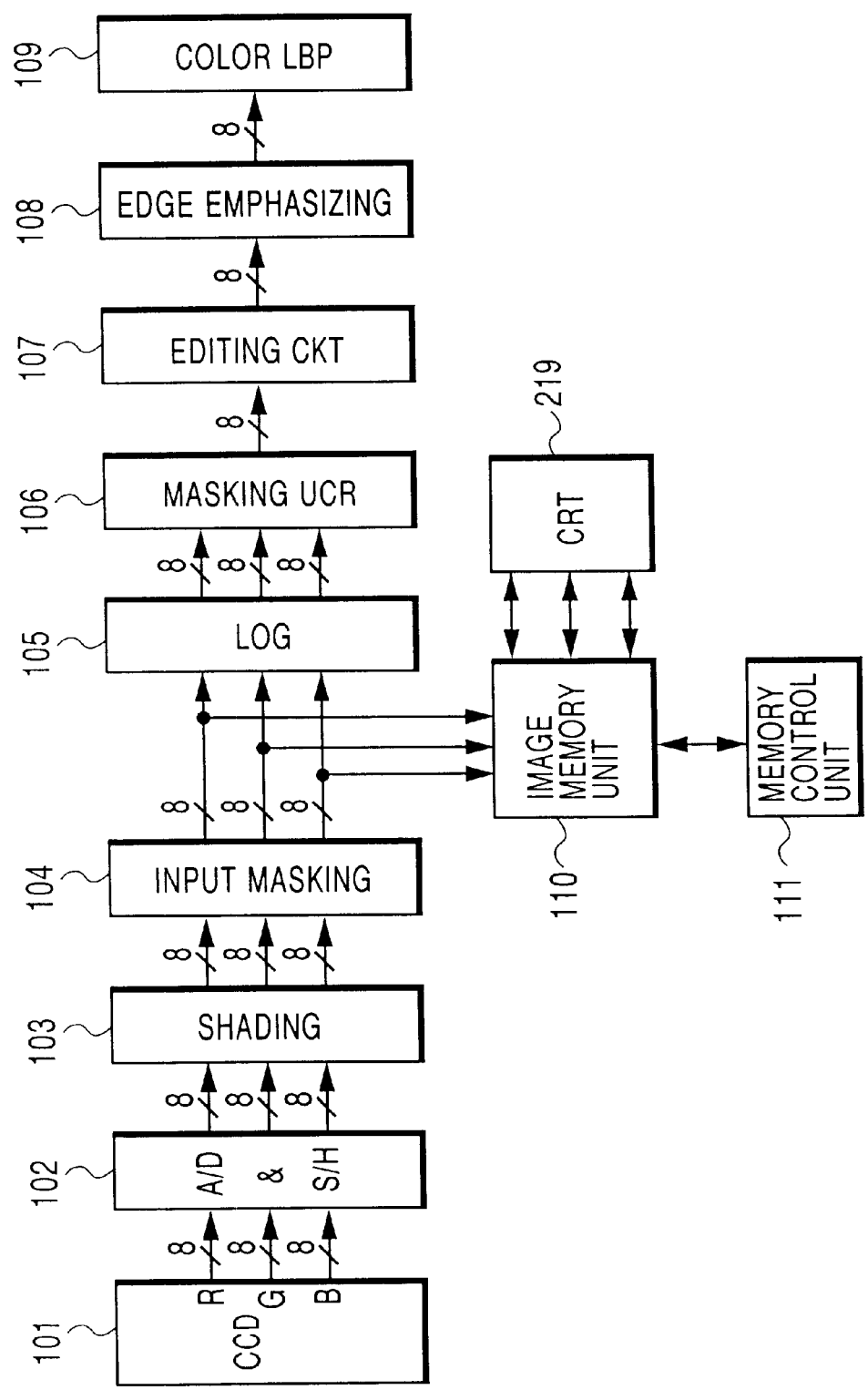
FIG. 24 is a diagram showing the structure of a conventional image processing apparatus.

Similarly, in the trimming process, since the other image processing cannot be performed for the outside of the area, the frames are displayed as shown in FIG. 23D.

The process of changing the frames in accordance with the contents of the designated image processing, is performed by CPU 240 when all areas and image processing are set. The change data is stored in the area memory unit 238 and memory 217-20 similar to the second embodiment.

Each area process, image processing, or each area may be provided with a priority order a user desires. In this case, the area frame is changed and displayed in accordance with the priority order.

In this second modification, in accordance with the designated area, area process, and image processing, the area frame on the reproduced image can be displayed. Accordingly, the user can efficiently modify the settings of an area, area process, and image processing.

As described so far, according to the second embodiment, the area frame can be easily recognized during the area editing so that the editing process can be efficiently executed.

Particularly, the outer frame color is set by a color inversion process so that the frame color can be easily distinguished from the original.

Since the display a user desires can be obtained, the area editing can be performed efficiently.

Further, since the area frame is calculated in accordance with the contents of the designated image processing, the area where the image processing is performed can be easily recognized.

Still further, since the outer frame is calculated in accordance with the priority order, the area where the image processing is performed can be easily recognized.

(Other Embodiments of the Invention)

The invention is applicable to a system constituted by a plurality of apparatus (such as a host computer, an interface unit, a reader, a printer, and the like) or to a single apparatus (such as a copier, a facsimile).

The scope of the invention includes the case wherein software program codes realizing the functions of the embodiments are supplied to a computer (CPU or MPU) of a system or an apparatus connected to various devices for operating to realize such functions and the devices are operated in accordance with the program codes.

In this case, the software program codes realize the functions of the embodiments. Therefore, the program codes themselves and means for supplying the program codes to a computer such as a storage medium storing the program codes fall within the scope of the invention.

The storage medium for storing program codes may be a floppy disk, a hard disk, an optical disk, a magnetooptical disk, a CD-ROM, a magnetic tape, a non-volatile memory card, a ROM, or the like.

The functions of the embodiments are realized not only by the program codes supplied to a computer, but also by an operating system or another application software running on a computer supplied with the program codes. Therefore, these program codes obviously fall within the scope of the invention.

The scope of the invention also includes the case wherein the program codes area stored in a memory of a function extension board or unit and a CPU or the like of the board or unit performs part or the whole of the actual processes to realize the functions of the embodiments.

The invention is not limited only to the above embodiments, but various modifications are possible without departing from the scope of appended claims.

What is claimed is:

1. An image processing apparatus for setting a plurality of area processes, each of the plurality of area processes performing an image processing according to a user's instruction, said apparatus comprising:

setting means for setting areas in an input image and grouping the set areas; and area process setting means for setting an image processing to the group of areas, wherein:

if the position of an area in the image set by said area setting means is to be distinguished, the image is synthesized with a frame image of an outer frame of said area in a first color and the synthesized image is displayed; and if the position of a group of areas set by said area process setting means is to be distinguished, the image is synthesized with the frame image of the outer frames of said group of areas in a second color and the synthesized image is displayed.

2. An image processing apparatus according to claim 1, further comprising:

area fine adjusting means for finely adjusting the set area in accordance with the displayed image, wherein the outer frame of the area to be finely adjusted is displayed with a third color.

3. An image processing apparatus according to claim 1, further comprising:

scanning means for scanning an original image and generating image data;

image processing means for performing the set image processing of said image data for each area; and image forming means for forming a reproduced image on a recording medium in accordance with the processed image data, wherein the displayed image corresponds to a preview image of the reproduced image.

4. An image processing apparatus according to claim 1, further comprising color setting means for manually setting the first or second color.

5. An image processing method for setting a plurality of area processes, each of the plurality of area processes performing an image processing according to a user's's instruction, said method comprising the steps of:

setting areas in an input image and grouping the set areas; and setting an image processing to the group of areas, wherein:

if the position of an area in the image set by said area setting step is to be distinguished, the image is synthesized with a frame image of an outer frame of said area in a first color and the synthesized image is displayed; and if the positions of a group of areas set by said area process setting step is to be distinguished, the image is synthesized with the frame image of the outer frames of said group of areas in a second color and the synthesized image is displayed.

* * * * *

UNITED STATES PATENT AND TRADEMARK OFFICE
CERTIFICATE OF CORRECTION

PATENT NO. : 6,330,085 B1
DATED : December 11, 2001
INVENTOR(S) : Nobuo Yamamoto et al.

It is certified that error appears in the above-identified patent and that said Letters Patent is hereby corrected as shown below:

Column 7,
Line 57, "rise" should read -- to rise --.

Column 10,
Line 39, "R2=b11*R1=b12*G1+b13*b1" should read -- R2=b11*R1+b12*G1+b13*b1 --.
  G2=b21*R1=b22*G1+b23*B1           G2=b21*R1+b22*G1+b23*B1
  B2=b31*R1=b32*G1+b33*B1           B2=b31*R1+b32*G1+b33*B1.

Column 22,
Line 46, "user's'" should read -- user's --.

Signed and Sealed this

Seventh Day of May, 2002

Attest:

Attesting Officer

JAMES E. ROGAN
Director of the United States Patent and Trademark Office